US012743797B2

(12) United States Patent
Matsunobu et al.

(10) Patent No.: US 12,743,797 B2
(45) Date of Patent: Sep. 22, 2026

(54) THREE-DIMENSIONAL DISPLACEMENT MEASURING METHOD AND THREE-DIMENSIONAL DISPLACEMENT MEASURING DEVICE

(71) Applicant: Panasonic Intellectual Property Management Co., Ltd., Osaka (JP)

(72) Inventors: Toru Matsunobu, Osaka (JP); Toshiyasu Sugio, Osaka (JP); Satoshi Yoshikawa, Hyogo (JP); Masaki Fukuda, Osaka (JP); Kensho Teranishi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 826 days.

(21) Appl. No.: 17/577,733

(22) Filed: Jan. 18, 2022

(65) Prior Publication Data

US 2022/0138971 A1 May 5, 2022

Related U.S. Application Data

(63) Continuation of application No. PCT/JP2020/026801, filed on Jul. 9, 2020.

(30) Foreign Application Priority Data

Jul. 30, 2019 (JP) ................................ 2019-139581

(51) Int. Cl.

| | |
|---|---|
| ***G06T 7/292*** | (2017.01) |
| ***G06T 7/246*** | (2017.01) |
| ***G06T 7/80*** | (2017.01) |

(52) U.S. Cl.

CPC ............. *G06T 7/292* (2017.01); *G06T 7/246* (2017.01); *G06T 7/80* (2017.01)

(58) Field of Classification Search

CPC .......... G06T 7/292; G06T 7/246; G06T 7/80; G06T 2207/10021; G06T 2207/10024; G06T 2207/30164

See application file for complete search history.

(56) References Cited

U.S. PATENT DOCUMENTS

2013/0329953 A1* 12/2013 Schreier .................. G06T 7/579 382/103

FOREIGN PATENT DOCUMENTS

| | | | |
|---|---|---|---|
| JP | 2010-250452 | | 11/2010 |
| JP | 2019-74991 | | 5/2019 |
| WO | WO 2018/135510 | * | 7/2018 |

OTHER PUBLICATIONS

Machine translation for WO 2018/135510 (Year: 2018).*

(Continued)

*Primary Examiner* — Qian Yang

(74) *Attorney, Agent, or Firm* — Wenderoth, Lind & Ponack, L.L.P.

(57) ABSTRACT

A three-dimensional displacement measuring method includes: calculating camera parameters of N cameras based on M correction images shot at M viewpoints by cameras including the N cameras, where N is an integer greater than 1 and M is an integer greater than N, the M viewpoints being mutually different; and measuring a displacement over time of a subject caused by vibration of the subject in a three-dimensional space, based on (1) sets of N images and (2) the camera parameters. The N images in each of the sets are generated by the N cameras shooting the subject at the same time, and the sets are generated at different times. The different times are set according to a frequency of the vibration of the subject.

9 Claims, 16 Drawing Sheets

(56) References Cited

OTHER PUBLICATIONS

Ito et al. “Free-Viewpoint Image Synthesis From Multiple-View Images Taken With Uncalibrated Moving Cameras”, IEEE International Conference on Image Processing 2005 (Year: 2005).*

International Search Report (ISR) issued on Sep. 24, 2020 in International (PCT) Application No. PCT/JP2020/026801.

* cited by examiner

FIG. 1
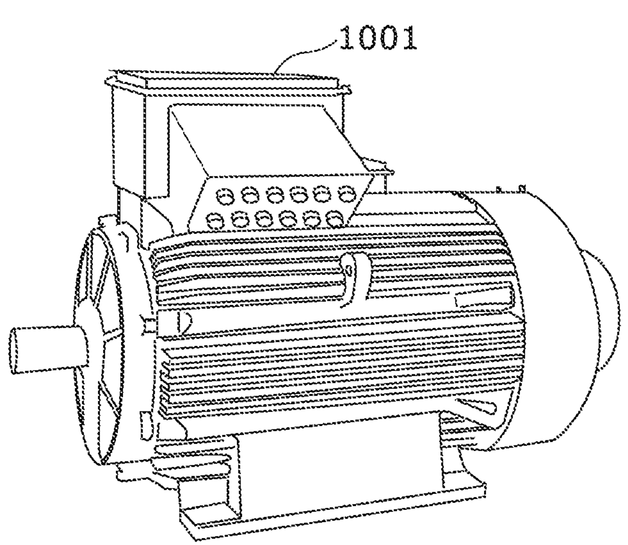
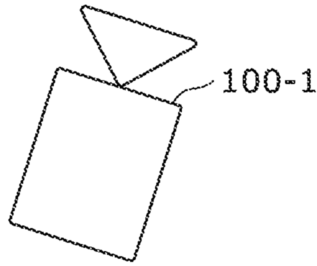
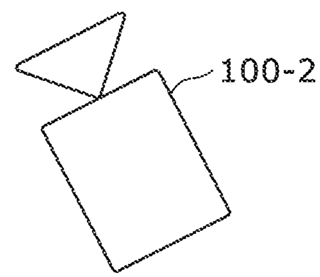

FIG. 2

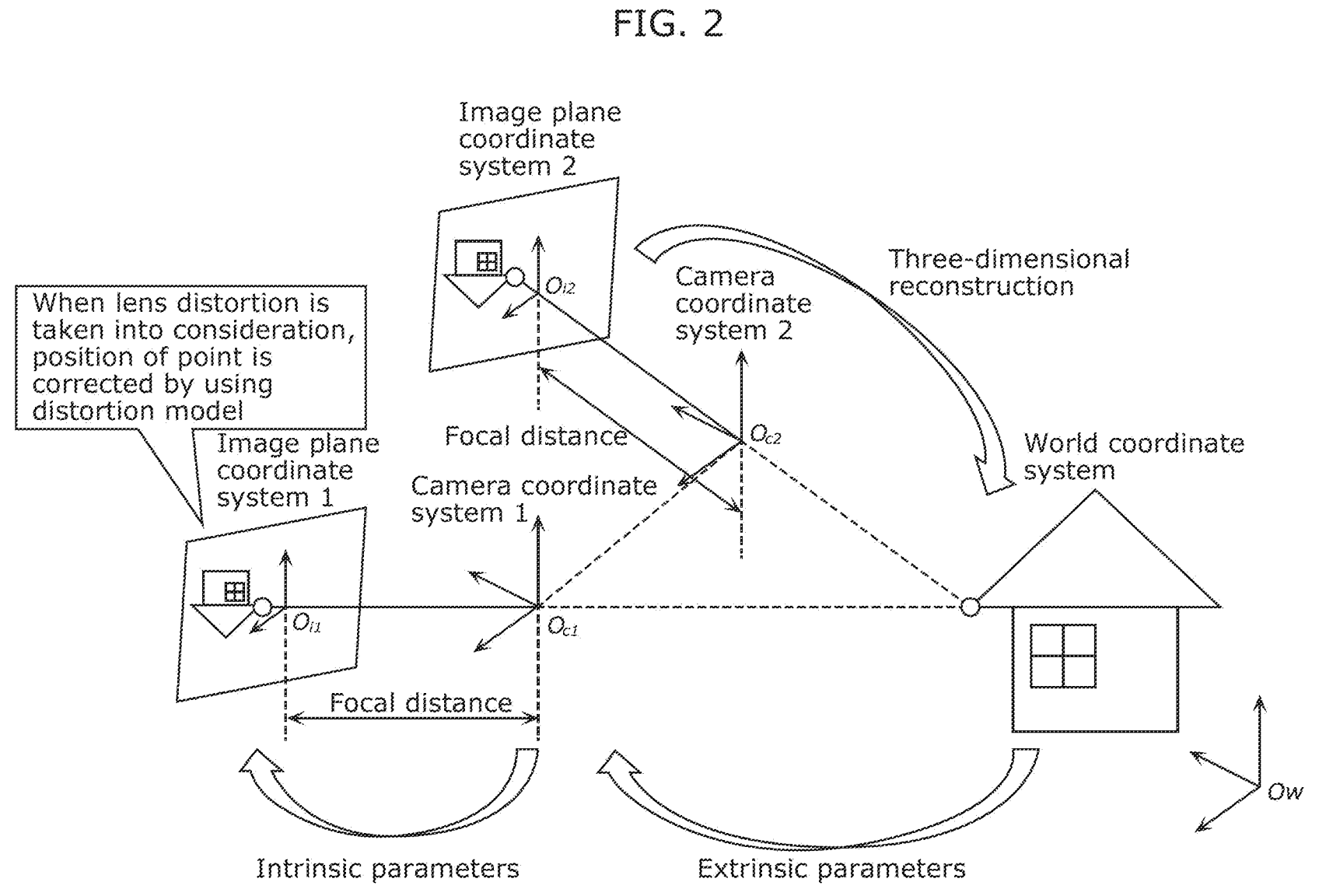

Image plane coordinate system 2

$O_{I2}$

Focal distance

Camera coordinate system 2

$O_{C2}$

Three-dimensional reconstruction

World coordinate system $O_W$

When lens distortion is taken into consideration, position of point is corrected by using distortion model Image plane coordinate system 1

$O_{I1}$

Camera coordinate system 1

$O_{C1}$

Focal distance

Intrinsic parameters

Extrinsic parameters

Time (t)

Camera 100-1

Camera 100-2

Exposure time is overlapped,
images at same time
are thus included

FIG. 4B

Camera 100-1

Camera 100-2

Exposure time

Time (t)

Exposure time is not overlapped, images at same time are thus not included

10
10
10
100-a
100-a
100-a
100-a
100-a
100-a
100-a
100-a
100-b
100-b
100-b
100-b
: Fixed camera
: Non-fixed camera

THREE-DIMENSIONAL DISPLACEMENT MEASURING METHOD AND THREE-DIMENSIONAL DISPLACEMENT MEASURING DEVICE

CROSS REFERENCE TO RELATED APPLICATIONS

This is a continuation application of PCT International Application No. PCT/JP2020/026801 filed on Jul. 9, 2020, designating the United States of America, which is based on and claims priority of Japanese Patent Application No. 2019-139581 filed on Jul. 30, 2019. The entire disclosures of the above-identified applications, including the specifications, drawings and claims are incorporated herein by reference in their entirety.

FIELD

The present disclosure relates to a three-dimensional displacement measuring method and a three-dimensional displacement measuring device.

BACKGROUND

In the three-dimensional reconstruction technology in the field of computer vision, feature points of a plurality of two-dimensional images are associated with one another so that the positions and orientations of cameras, and the three-dimensional position of a subject are estimated. Furthermore, in the three-dimensional reconstruction technology, camera calibration and three-dimensional point reconstruction are performed.

For example, the apparatus described in Patent Literature (PTL) 1 performs calibration among three or more cameras, and converts each camera coordinate system into a virtual camera coordinate system of arbitrary viewpoint based on acquired camera parameters. The apparatus performs association between images after coordinate conversion by block matching in the virtual camera coordinate system, to estimate distance information.

CITATION LIST

Patent Literature

PTL 1: Japanese Unexamined Patent Application Publication Number 2010-250452

SUMMARY

Technical Problem

By such related art described above cannot measure a displacement over time of a subject in a three-dimensional space effectively based on a plurality of images obtained by shooting the subject from a plurality of viewpoints.

In view of this, the present disclosure provides a technique that can measure a displacement over time of a subject in a three-dimensional space effectively based on a plurality of images obtained by shooting the subject from a plurality of viewpoints.

Solution to Problem

A three-dimensional displacement measuring method according to an aspect of the present disclosure includes:

calculating camera parameters of N cameras based on M correction images shot at M viewpoints by cameras including the N cameras, where N is an integer greater than 1 and M is an integer greater than N, the M viewpoints being mutually different; and measuring a displacement over time of a subject caused by vibration of the subject in a three-dimensional space, based on (1) sets of N images and (2) the camera parameters. The N images in each of the sets are generated by the N cameras shooting the subject at a same time, and the sets are generated at different times. The different times are set according to a frequency of the vibration of the subject.

Advantageous Effects

According to the present disclosure, it is possible to measure a displacement over time of a subject in a three-dimensional space effectively based on a plurality of images obtained by shooting the subject from a plurality of viewpoints.

BRIEF DESCRIPTION OF DRAWINGS

These and other advantages and features will become apparent from the following description thereof taken in conjunction with the accompanying Drawings, by way of non-limiting examples of embodiments disclosed herein.

FIG. 1 is a schematic diagram of performing three-dimensional displacement measurement in an embodiment.

FIG. 2 is a diagram illustrating a principle of three-dimensional modeling in an embodiment.

FIG. 3 is a diagram illustrating a principle of three-dimensional displacement measurement in an embodiment.

FIG. 4A is a diagram illustrating an example of a shooting cycle and an exposure time of a camera in an embodiment.

FIG. 4B is a diagram illustrating another example of a shooting cycle and an exposure time of a camera in an embodiment.

FIG. 11 is a diagram illustrating an example of a multi-viewpoint frame set in an embodiment.

FIG. 18 is a diagram illustrating an outline of three-dimensional space recognition.

Figure 5:
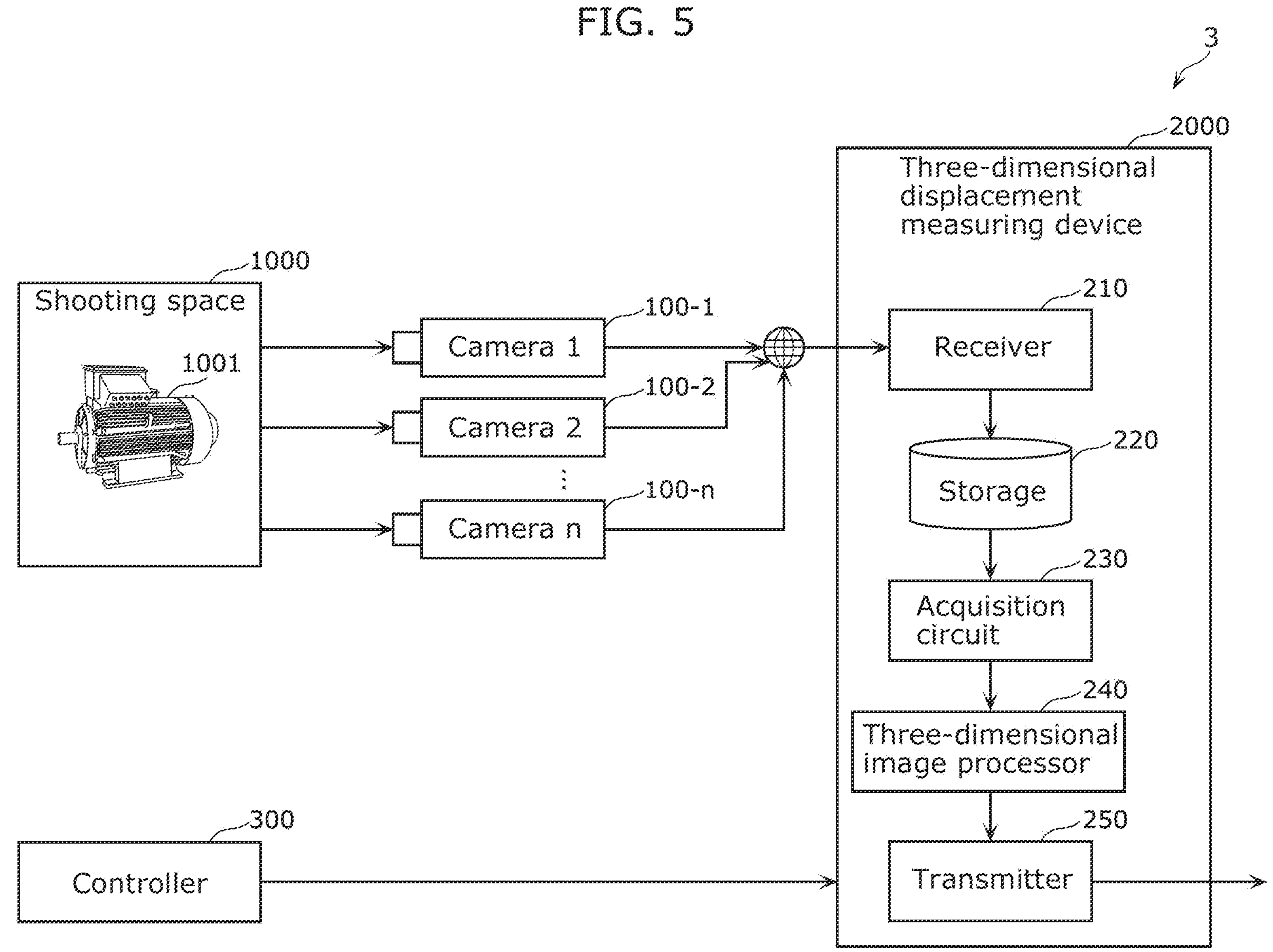
FIG. 5 is a block diagram of a three-dimensional displacement measuring device in an embodiment.

DESCRIPTION OF EMBODIMENTS (Underlying Knowledge Forming Basis of the Present Disclosure)

In the related art, three-dimensional space recognition is realized by reconstructing (modeling) a three-dimensional shape of a subject or using the result of the reconstruction. The three-dimensional space reconstructing device that reconstructs a three-dimensional shape of a subject performs the modeling using video data that is provided from an image capturing system including a plurality of cameras to capture videos of the same scene and using camera parameters that represent positions, orientations, and the like (hereinafter, referred to as "position and orientation") of the cameras obtained through calibration. The positions of the cameras each correspond to a viewpoint.

In addition, there is a demand for keeping track of a displacement of a measurement object such as a structure (e.g., an infrastructural structure) and a machine component in a three-dimensional space. However, the related art is incapable of measuring a displacement over time of a subject being a measurement object in a three-dimensional space effectively. For example, the related art is insufficient to reduce a processing load of measuring a displacement over time of a subject in a three-dimensional space.

In general, camera correcting processing and three-dimensional displacement measuring processing involve a trade-off relation: as the number of viewpoints (viewpoint count), that is, as the number of images increases, accuracy is improved, while the processing load increases. With regard to this trade-off relation, the inventors found that by giving priority to accuracy of camera correction over accuracy of three-dimensional displacement measurement, accuracies of the two types of processing are improved as a whole while the increase in processing load is suppressed.

In view of this, a three-dimensional displacement measuring method according to an aspect of the present disclosure includes: calculating camera parameters of N cameras based on M correction images shot at M viewpoints by cameras including the N cameras, where N is an integer greater than 1 and M is an integer greater than N, the M viewpoints being mutually different; and measuring a displacement over time of a subject caused by vibration of the subject in a three-dimensional space, based on (1) sets of N images and (2) the camera parameters. The N images in each of the sets are generated by the N cameras shooting the subject at a same time, and the sets are generated at different times. The different times are set according to a frequency of the vibration of the subject.

This allows the three-dimensional displacement measuring method to improve the accuracy of the three-dimensional displacement measuring processing by using viewpoint count M, which is greater than viewpoint count N for the three-dimensional displacement measuring processing, for the camera correcting processing to improve an accuracy of the camera parameters.

Furthermore, for example, the frequency of the vibration may be a resonance frequency of the subject.

Furthermore, for example, the different times may include at least three different times for each time period represented by a reciprocal of the resonance frequency.

Furthermore, for example, in the three-dimensional displacement measuring method according to an aspect of the present disclosure, the measuring of the displacement may include: calculating three-dimensional points each of which is a three-dimensional point corresponding to a different one of the different times, by performing, on each of the sets of N images: (i) calculating a first corresponding point of the subject and a second corresponding point which corresponds to the first corresponding point, the first corresponding point being included in a first image included in the N images, the second corresponding point being included in a second image included in the N images; and (ii) calculating a three-dimensional point of the subject in the three-dimensional space, based on the camera parameters, the first corresponding point, and the second corresponding point; and calculating a displacement over time of the three-dimensional point, from the three-dimensional points.

This allows the three-dimensional displacement measuring method to determine a displacement of a subject in a three-dimensional space by determining a displacement over time of a three-dimensional point based on the camera parameters, the first corresponding point, and the second corresponding point using, for example, a technique of image matching and the principle of triangulation.

Furthermore, for example, in the three-dimensional displacement measuring method according to an aspect of the present disclosure, N may be determined based on the camera parameters and an accuracy of the measuring of the displacement.

This allows the three-dimensional displacement measuring method to determine viewpoint count N of the cameras such that an accuracy of the measurement performed in the measuring of a displacement is satisfied. As a result, the three-dimensional displacement measuring method can determine a displacement of a subject in a three-dimensional space with accuracy.

Moreover, the inventors of the present application found that the accuracy of the camera correction is improved by the following arrangement rather than disposing viewpoints used for the camera corrections evenly. Furthermore, for example, in the three-dimensional displacement measuring method according to an aspect of the present disclosure, the N cameras may include a first camera and a second camera which are disposed next to each other, and the M viewpoints may include a first midpoint between a first position at which the first camera is disposed and a second position at which the second camera is disposed. When a midpoint between the first position and the first midpoint is designated as a second midpoint, more viewpoints among the M viewpoints may be provided between the second midpoint and the first position than between the first midpoint and the second midpoint.

That is, in this aspect, the viewpoints used for the camera correction are set more within ranges closer to the second midpoint than within ranges away from the second midpoint with respect to the positions of the viewpoints used for the three-dimensional displacement measurement. Such an uneven arrangement improves an accuracy of the camera correction.

For example, in the calculating of the camera parameters, no viewpoint need be provided between the first midpoint and the second midpoint.

Furthermore, for example, the N cameras may include a non-fixed camera.

Furthermore, for example, a three-dimensional displacement measuring device according to an aspect of the present disclosure includes: memory; and a processor coupled to the memory and configured to: calculate camera parameters of N cameras based on M correction images shot at M viewpoints by cameras including the N cameras, where N is an integer greater than 1 and M is an integer greater than N, the M viewpoints being mutually different; and measure a displacement over time of a subject caused by vibration of the subject in a three-dimensional space, based on (1) sets of N images and (2) the camera parameters. The N images in each of the sets are generated by the N cameras shooting the subject at a same time, and the sets are generated at different times. The different times are set according to a frequency of the vibration of the subject.

Accordingly, the three-dimensional displacement measuring device can produce the same advantageous effect as the three-dimensional displacement measuring method according to an aspect of the present disclosure.

Hereinafter, exemplary embodiments will be described with reference to the Drawings.

It should be noted that each of the exemplary embodiments described below shows a general or specific example. The numerical values, shapes, materials, structural components, the arrangement and connection of the structural components, steps, the processing order of the steps, etc., shown in the following exemplary embodiments are mere examples, and therefore do not limit the scope of the appended Claims and their equivalents. Therefore, among the structural components in the following exemplary embodiments, those not recited in any one of the independent claims which indicate the broadest concepts are described as optional structural components. Furthermore, the respective figures are not necessarily precise illustrations. In the figures, structural components that are substantially the same are assigned the same reference signs, and overlapping description may be omitted or simplified.

Embodiment

The three-dimensional displacement measuring device according to the present embodiment can reconstruct a time-series three-dimensional model whose coordinate axes are consistent between times. Here, a three-dimensional reconstruction in the present disclosure will be defined. A video or an image which is obtained by shooting a subject present in a real space by a plurality of cameras from different viewpoints is called as a multi-viewpoint video or a multi-viewpoint image. That is, a multi-viewpoint image includes a plurality of two-dimensional images obtained by shooting a same subject from different viewpoints. Moreover, multi-viewpoint images shot in time-series are called as a multi-viewpoint video. Reconstructing a subject in a three-dimensional space by using the multi-viewpoint image is called as three-dimensional reconstruction.

Specifically, first, the three-dimensional displacement measuring device acquires a three-dimensional model at each time by performing three-dimensional reconstruction independently at each time. Next, the three-dimensional displacement measuring device detects a stationary camera and a stationary object (stationary three-dimensional point) and performs coordinate matching of three-dimensional model between times using the detected stationary camera and stationary object, thereby generating a time-series three-dimensional model whose coordinate axes are consistent between times.

This allows the three-dimensional displacement measuring device to generate a time-series three-dimensional model in which relative positional relationship between the subject and the camera at each time is highly accurate regardless of fixed/non-fixed state of the camera or moving/stationary state of the subject, and which can utilize transition information that changes in a time direction.

FIG. 1 is a schematic diagram of performing three-dimensional displacement measurement in an embodiment. In a three-dimensional displacement measuring method in an embodiment, subject 1001 is shot by camera 100-1 and camera 100-2. Here, subject 1001 may be a compressor or the like that is fixed at a predetermined position. Camera 100-1 and camera 100-2 may be fixed cameras that are fixed at positions different from each other and in orientations such that shooting ranges of camera 100-1 and camera 100-2 include subject 1001. For example, a space or subject 1001 to be shot can be three-dimensionally reconstructed by shooting the same space or same subject 1001 from multi-viewpoints by using one or a plurality of corrected cameras (for example, fixed cameras). That is, positions of the camera and orientations of the camera as well as a three-dimensional displacement or a three-dimensional position of subject 1001 can be estimated by associating feature points between a plurality of two-dimensional images shot from multi-viewpoints. In other words, the three-dimensional displacement measuring device uses the plurality of two-dimensional images shot from the multi-viewpoints to perform camera correction, three-dimensional displacement measurement of subject 1001, and the like. The three-dimensional displacement measuring device may further perform three-dimensional reconstruction of subject 1001.

The three-dimensional displacement measurement is useful to, for example, an infrastructural structure inspection system. For example, there is a need of measurement in which a measuring device measures vibrations in a wall such as a sound-proof wall for the Shinkansen (Japanese bullet train) in a depth direction of the wall. There is also a need of measurement in which a measuring device measures displacements of an apparatus that produces vibrations in its operation, such as a compressor.

FIG. 2 is a diagram illustrating the principle of three-dimensional modeling in an embodiment. First, the three-dimensional modeling in the present embodiment will be defined. In the present embodiment, the three-dimensional modeling refers to modeling in which a subject present in a real space is reconstructed in a three-dimensional space by a three-dimensional displacement measuring device using two-dimensional multi-viewpoint videos shot by a plurality of cameras from different viewpoints. Note that the three-dimensional modeling may be hereinafter referred to as three-dimensional reconstruction.

As illustrated in FIG. 2, by using camera coordinates and camera parameters of at least two viewpoints, a triangle illustrated by dotted lines is formed. By the three-dimensional displacement measuring method in an embodiment, points of an image plane represented in an image plane coordinate system of an image shot by each camera are reconstructed in a form of a three-dimensional model in a world coordinate system, based on the principle of triangulation using this triangle. The image plane coordinate system is, for example, image plane coordinate system 1 or image plane coordinate system 2 illustrated in FIG. 2. The three-dimensional model results from reconstructing a subject in the three-dimensional space represented in the world coordinate system (that is, three-dimensional reconstruction). The three-dimensional model represents three-dimensional positions of a plurality of points on the subject depicted on a plurality of two-dimensional images shot from multi-viewpoints. Here, the three-dimensional positions are each represented by, for example, information on three values consisting of an X component, a Y component, and a Z component that are indicated based on an orthogonal coordinate system (XYZ axes) in the three-dimensional space. Note that information on each point in the three-dimensional model may include, in addition to information representing a three-dimensional position of the point, information indicating the color of the point and a surface feature at and around the point.

For the three-dimensional modeling, the camera parameters of each camera may be acquired in advance or may be estimated at the same time as creation of the three-dimensional model. Here, the camera parameters include intrinsic parameters and extrinsic parameters. The intrinsic parameters include a focal distance, an image center, and the like of the camera, and the extrinsic parameters include a three-dimensional position, a three-dimensional orientation, and the like of the camera.

In FIG. 2, a typical pinhole camera model is used as an example. In this example, lens distortion of camera is not taken into consideration. When taking lens distortion into consideration for the three-dimensional modeling, a corrected position obtained by normalizing, by a distortion model, the position of a point in the image plane coordinate system of an image shot by each camera is used as a position of each point used in the three-dimensional model.

Figure 3:
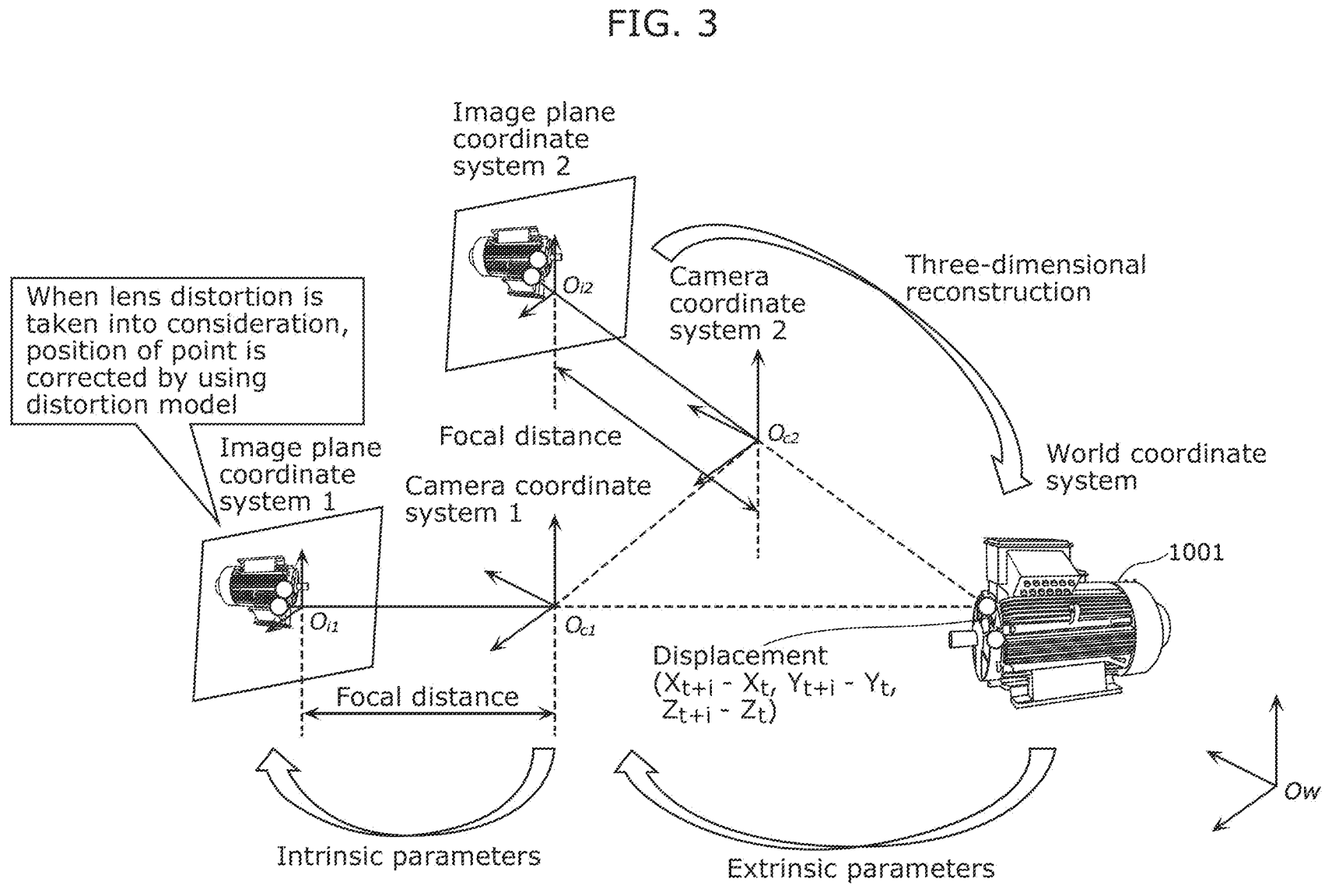

FIG. 3 is a diagram illustrating the principle of three-dimensional displacement measurement in an embodiment. A three-dimensional displacement measuring method according to the present disclosure will be defined. The three-dimensional displacement measurement refers to calculating a displacement of subject 1001 in a three-dimensional space using two-dimensional images shot from multi-viewpoints. FIG. 3 illustrates how the three-dimensional displacement measurement works. By using camera coordinates and camera parameters of at least two viewpoints, a triangle illustrated by dotted lines in FIG. 3 is formed. Based on the principle of triangulation using this triangle, points on images shot at a plurality of viewpoints and represented in image plane coordinate systems are reconstructed in the world coordinate system. The image plane coordinate system is, for example, image plane coordinate system 1 or image plane coordinate system 2 illustrated in FIG. 3.

A three-dimensional model of subject 1001 is represented in a form of three-dimensional positions of a plurality of points on subject 1001 depicted on a plurality of two-dimensional images shot from multi-viewpoints. When subject 1001 moves or vibrates, and when positions $(X_t, Y_t, Z_t)$ and $(X_{t+i}, Y_{t+i}, Z_{t+i})$ of a three-dimensional point of subject 1001 are reconstructed at time t and time t+i, a displacement $(X_{t+i}-X_t, Y_{t+i}-Y_t, Z_{t+i}-Z_t)$ for time i is calculated. In the three-dimensional displacement measurement, for example, the displacement only in a depth direction (Z component) may be measured. That is, what is called a depth map may be created in the three-dimensional displacement measurement. Alternatively, in the three-dimensional displacement measurement according to the present disclosure, any two of the X component, the Y component, and the Z component of the displacement may be measured.

Note that, for example, when subject 1001 is a vibrating body such as a compressor, time difference i is the inverse of a frequency with which the resonance frequency of the vibrating body can be sampled. The time difference i is however not limited to this. For example, when subject 1001 is a structure, and when a growth of a crack in the structure is to be measured, the time difference i is determined in accordance with the number of years for which the structure is required to last.

In the above example, a position of a three-dimensional point is reconstructed at time t and time t+i. However, the number of times that the reconstruction of a position of a three-dimensional point is performed is not limited to two, and the reconstruction may be performed three or more times at intervals of time difference i. Furthermore, when the number of times that a position of a three-dimensional point is reconstructed is three or more times at intervals of time difference i, the three-dimensional displacement measurement according to the present disclosure may calculate a displacement of the three-dimensional point as well as a velocity and an acceleration of the displacement.

The calculation in the three-dimensional displacement measurement is specifically as follows. First, in camera coordinate system 1, let a matrix representing intrinsic parameters of a camera be $K_1$, a translation vector representing a parallel translation out of the extrinsic parameters be $T_1$, and a rotation matrix representing a rotation be $R_1$. In camera coordinate system 2, let a matrix representing intrinsic parameters of a camera be $K_2$, a translation vector representing a parallel translation out of the extrinsic parameters be $T_2$, and a rotation matrix representing a rotation be $R_2$.

Next, for some point on subject 1001, corresponding points in image plane coordinate system 1 and image plane coordinate system 2 are calculated by image matching. Here, in the image matching, block matching may be performed, which searches for a position at which a difference value between blocks being rectangular regions in images is minimized. As the block matching, specifically, a degree of agreement of associated rectangular regions included in the images is evaluated with an agreement degree evaluation function such as the sum of absolute difference (SAD) or the sum of squared difference (SSD) in luminance, and a position at which an agreement degree evaluation value is maximized or minimized is searched for. As the agreement degree evaluation function, cross correlation (CC) or normalized cross correlation (NCC) may be used. In the image matching, feature matching such as scale-invariant feature transform (SIFT) and speeded up robust features (SURF), which searches for a position at which a difference value in feature vector between images is minimized, and the feature vector is calculated from small regions of each of the images, may be performed.

In the image matching, let the corresponding point in image plane coordinate system 1 at time t be $a_{1,t}=(x_{1,t}, y_{1,t})$, and the corresponding point in image plane coordinate system 2 at time t be $b_{2,t}=(x_{2,t}, y_{2,t})$. The corresponding point $a_{1,t}$ in image plane coordinate system 1 is a specific example of a first corresponding point, and the corresponding point $b_{2,t}$ in image plane coordinate system 2 is a specific example of a second corresponding point. Furthermore, let the corresponding point in image plane coordinate system 1 at time t+i be $a_{1,t+i}=(x_{1,t+i}, y_{1,t+i})$, and the corresponding point in image plane coordinate system 2 at time t+i be $b_{2,t+i}=(x_{2,t+i}, y_{2,t+i})$. Note that the processing described here corresponds to calculating a first corresponding point and a second corresponding point.

Then, three-dimensional points representing three-dimensional positions corresponding to $a_{1,t}$, $b_{2,t}$, $a_{1,t+i}$, and $b_{2,t+i}$ are calculated from the intrinsic parameters and the extrinsic parameters of the cameras. Let $A_{1,t}$ be a three-dimensional point equivalent to $a_{1,t}$ at time t, $B_{2,t}$ be a three-dimensional point equivalent to $b_{2,t}$ at time t, $A_{1,t+i}$ be a three-dimensional point equivalent to $a_{1,t+i}$ at time t+i, and $B_{2,t+i}$ be a three-dimensional point equivalent to $b_{2,t+i}$ at time t+i.

The conversion between the corresponding points on the two-dimensional image and the three-dimensional points equivalent to the corresponding points is calculated by the following Equations (1) to (4).

$$a_{1,t} = K_1[R_1 \mid T_1]A_{1,t} \quad \text{Equation (1)}$$

$$b_{2,t} = K_2[R_2 \mid T_2]B_{2,t} \quad \text{Equation (2)}$$

$$a_{1,t+i} = K_1[R_1 \mid T_1]A_{1,t+i} \quad \text{Equation (3)}$$

$$b_{2,t+i} = K_2[R_2 \mid T_2]B_{2,t+i} \quad \text{Equation (4)}$$

In this situation, the three-dimensional points $A_{1,t}$ and $B_{2,t}$ equivalent to the corresponding points on the two-dimensional images are the same point in the world coordinate system, but the three-dimensional points $A_{1,t}$ and $B_{2,t}$ calculated by Equation (1) and Equation (2) do not necessarily match. Similarly, the three-dimensional points $A_{1,t+i}$ and $B_{2,t+i}$ are the same point in the world coordinate system, but the three-dimensional points $A_{1,t+i}$ and $B_{2,t+i}$ calculated by Equation (3) and Equation (4) do not necessarily match. In that case, as shown by Equation (5) and Equation (6), the three-dimensional points equivalent to the corresponding points on the two-dimensional images may be calculated by calculating the midpoint of the three-dimensional points $A_{1,t}$ and $B_{2,t}$ or the midpoint of the three-dimensional points $A_{1,t+i}$ and $B_{2,t+i}$.

$$(X_t, Y_t, Z_t) = (A_{1,t} + B_{2,t})/2 \quad \text{Equation (5)}$$

$$(X_{t+i}, Y_{t+i}, Z_{t+i}) = (A_{1,t+i} + B_{2,t+i})/2 \quad \text{Equation (6)}$$

Note that how to determine the three-dimensional points when the three-dimensional points equivalent to the corresponding points on the two-dimensional images do not match is not limited to this. Only one of the three-dimensional points $A_{1,t}$ and $B_{2,t}$ or only one of the three-dimensional points $A_{1,t+i}$ and $B_{2,t+i}$ may be used as a three-dimensional point equivalent to a corresponding point on a two-dimensional image corresponding to time t or time t+i. Equation (5) and Equation (6) show a method for calculating a midpoint of two three-dimensional points, but another calculating method may be used. For example, a three-dimensional point at time t obtained as a weighted average of the three-dimensional points $A_{1,t}$ and $B_{2,t}$ or a three-dimensional point at time t+i obtained as a weighted average of the three-dimensional points $A_{1,t+i}$ and $B_{2,t+i}$ may be used as a three-dimensional point corresponding to time t or time t+i. Note that the processing described here corresponds to the step of calculating a three-dimensional point.

Note that the calculated three-dimensional point is not limited to a specific point of the subject. The three-dimensional point is any point of the subject as long as the three-dimensional point is determined from a corresponding point.

From the above, a three-dimensional displacement $V_{t,t+i}$ from time t to time t+i is calculated by Equation (7).

$$V_{t,t+i} = (X_{t+I} - X_t, Y_{t+i} - Y_t, Z_{t+i} - Z_t) \quad \text{Equation (7)}$$

Note that the processing described here corresponds to the step of calculating a displacement.

The method of three-dimensional displacement measurement described above is an example and is not limitative.

Figure 4A:
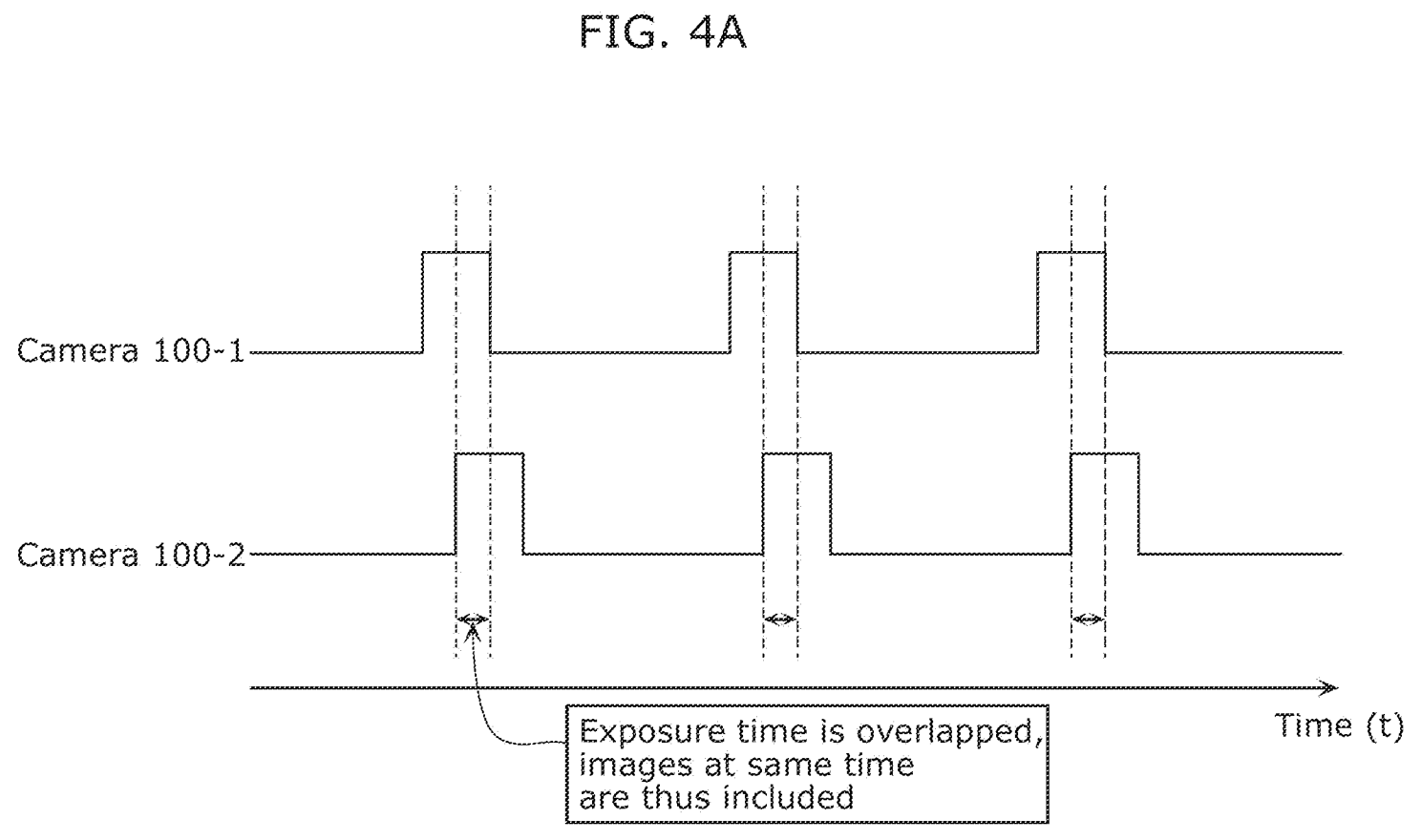
Figure 4B:
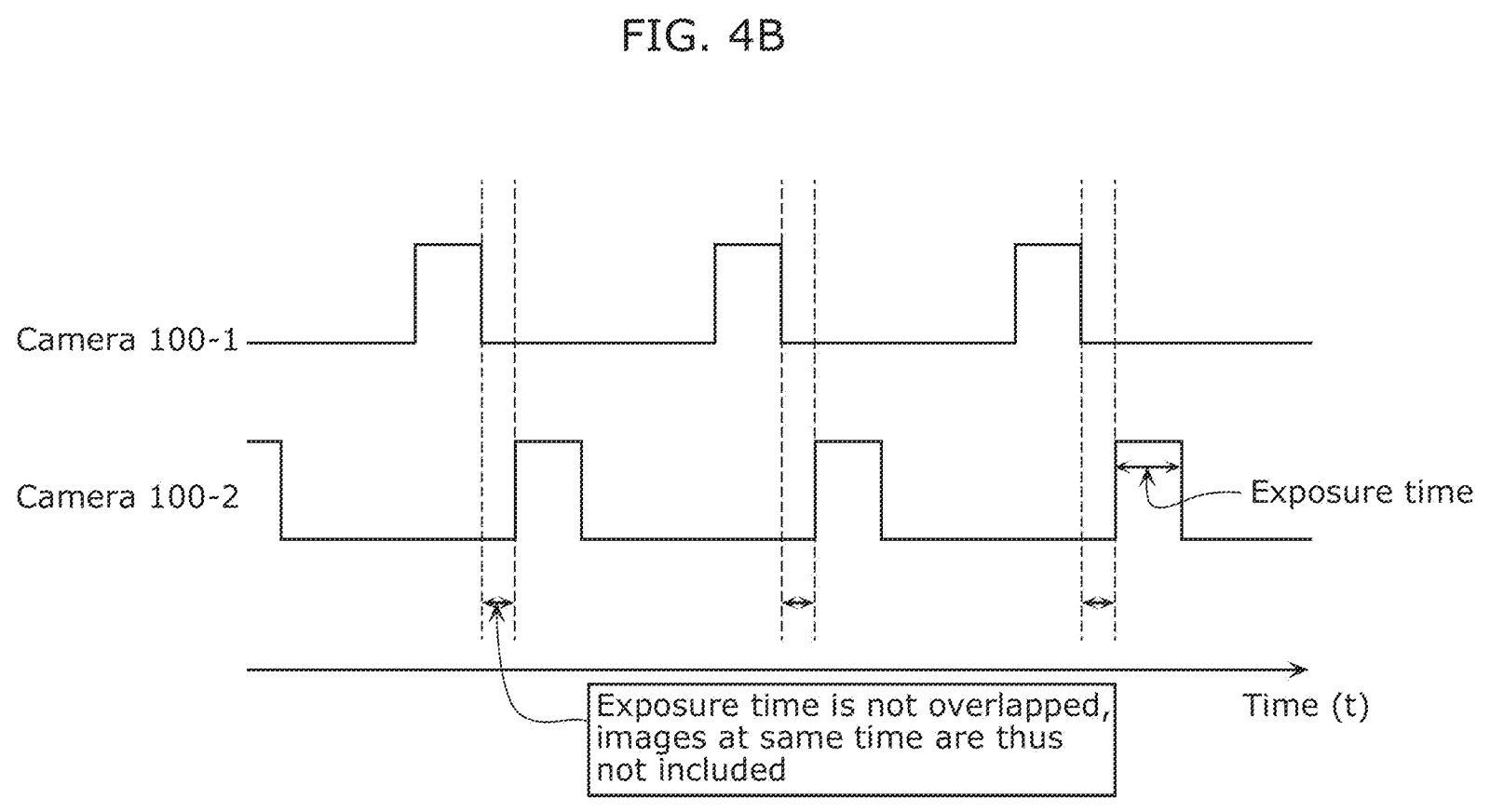

FIG. 4A is a diagram illustrating an example of a shooting cycle and an exposure time of a camera in an embodiment. FIG. 4B is a diagram illustrating another example of a shooting cycle and an exposure time of a camera in an embodiment. Lateral directions of FIGS. 4A and 4B indicate time, and a time during which a rectangular signal appears indicates that camera 100-1 or camera 100-2 is being exposed to light. When acquiring an image by camera 100-1 or camera 100-2, a time during which the shutter is opened is called as an exposure time.

During an exposure time, a scene which is exposed to an imaging element through a lens is obtained as an image. In FIG. 4A, exposure times are overlapped in frames which are shot by two cameras 100-1 and 100-2 with different viewpoints. For that reason, frames acquired by two cameras 100-1 and 100-2 are discriminated to be synchronous frames which include a scene of the same time.

On the other hand, in FIG. 4B, since there is no overlap of exposure time in two cameras 100-1 and 100-2, frames acquired by two cameras 100-1 and 100-2 are discriminated to be asynchronous frames which include no scene of the same time. Shooting synchronous frames by a plurality of cameras as shown in FIG. 4A is called as synchronous shooting.

Next, the configuration of a three-dimensional displacement measuring device according to the present embodiment will be described. FIG. 5 is a block diagram of the three-dimensional displacement measuring device in the embodiment. Three-dimensional reconstruction system 3 shown in FIG. 5 includes a plurality of cameras 100-1 to **100-*n*, three-dimensional displacement measuring device 2000, and controller 300. Three-dimensional displacement measuring device 2000 includes receiver 210, storage 220, acquisition circuit 230, three-dimensional image processor 240, and transmitter 250**.

The plurality of cameras 100-1 to **100-*n* shoot subject 1001 in shooting space 1000 and transmit a multi-viewpoint video which includes a plurality of shot videos to receiver 210. The transmission of the multi-viewpoint video may be performed via either of a public communication network such as the Internet, or a dedicated communication network. Alternatively, the multi-viewpoint video may be once stored in an external storage device such as a hard disk drive (HDD) or a solid state drive (SSD) etc. and is inputted into three-dimensional displacement measuring device 2000 as needed. Alternatively, the multi-viewpoint video is once transmitted to and stored in an external storage device such as a cloud server via a network. Then, the multi-viewpoint video may be transmitted to three-dimensional displacement measuring device 2000** as needed.

N cameras 100-1 to **100-*n* are each a fixed camera such as a monitor camera or a non-fixed camera that is not fixed. That is, n cameras 100-1 to 100-*n*** may be, for example, fixed cameras that are fixed at mutually different positions in mutually different orientations; mobile cameras such as video cameras, smart phones, or wearable cameras; or moving cameras such as drones with a shooting function. Note that n is an integer at least two.

Moreover, camera-specific information such as a camera ID to identify the camera used for shooting may be added to the multi-viewpoint video as header information of video or frame.

Synchronous shooting to shoot a subject at a same time may be performed in each frame by using the plurality of cameras 100-1 to **100-*n*. Alternatively, time of the clocks contained in the plurality of cameras 100-1 to 100-*n*** are adjusted, and shooting time information may be added to a shot image, or an index number to indicate shooting order may be added to the shot image for each video or frame without performing synchronous shooting.

Information to indicate whether synchronous shooting is performed or asynchronous shooting is performed may be added as header information to each video set, each video, or each frame of multi-viewpoint video.

Controller 300 is implemented, for example, with a central processing unit (CPU), which reads out and executes a program stored in storage 220. Controller 300 determines the number of viewpoints (viewpoint count) and viewpoint positions to be used by three-dimensional reconstruction system 3 for performing at least one of types of processing including camera correction, three-dimensional modeling, and three-dimensional displacement measurement by three-dimensional image processor 240. Here, the viewpoint count is the number of positions at which two-dimensional images to be used in at least one of types of processing including the camera correction, the three-dimensional modeling, and the three-dimensional displacement measurement are shot, and specifically may be the number of cameras or may be the number of locations at which shooting is to be performed by fixed cameras and moving cameras. The viewpoint positions are positions at which two-dimensional images to be used in at least one of types of processing including the camera correction, the three-dimensional modeling, and the three-dimensional displacement measurement are shot, and are specifically positions of cameras.

Receiver 210 receives a multi-viewpoint video shot by cameras 100-1 to **100-*n* and inputs the received multi-viewpoint video into storage 220**.

Storage 220 stores the inputted multi-viewpoint video. Storage 220 temporarily stores video data obtained by shooting shooting space 1000, meta information such as a time stamp to be attached to the video data, camera parameters of cameras 100-1 to **100-*n*, and shooting settings including a frame rate or a resolution, etc. being applied. Storage 220 stores a program to be read out and executed by controller 300. Storage 220 may be a volatile memory such as a RAM, DRAM, and SRAM. Moreover, storage 220** may be implemented as a nonvolatile memory such as a ROM and flash memory.

Acquisition circuit 230 selects frames from a plurality of multi-viewpoint videos stored in storage 220 and inputs the selected frames to three-dimensional image processor 240 as a multi-viewpoint frame set.

Three-dimensional image processor 240 uses the inputted multi-viewpoint frame set to perform the camera correction, and uses the result of the camera correction to perform the three-dimensional modeling of the subject or the three-dimensional displacement measurement of the subject. Three-dimensional image processor 240 calculates camera parameters as the result of the camera correction and outputs them to transmitter 250.

Transmitter 250 transmits at least one of the camera parameters, the three-dimensional model of the subject, and the three-dimensional displacement of the subject calculated by three-dimensional image processor 240 to the outside of three-dimensional displacement measuring device 2000.

Receiver 210, acquisition circuit 230, three-dimensional image processor 240, and transmitter 250 may be implemented as a processor and a memory. Alternatively, receiver 210, acquisition circuit 230, three-dimensional image processor 240, and transmitter 250 may be implemented as a dedicated circuit.

Figure 6:
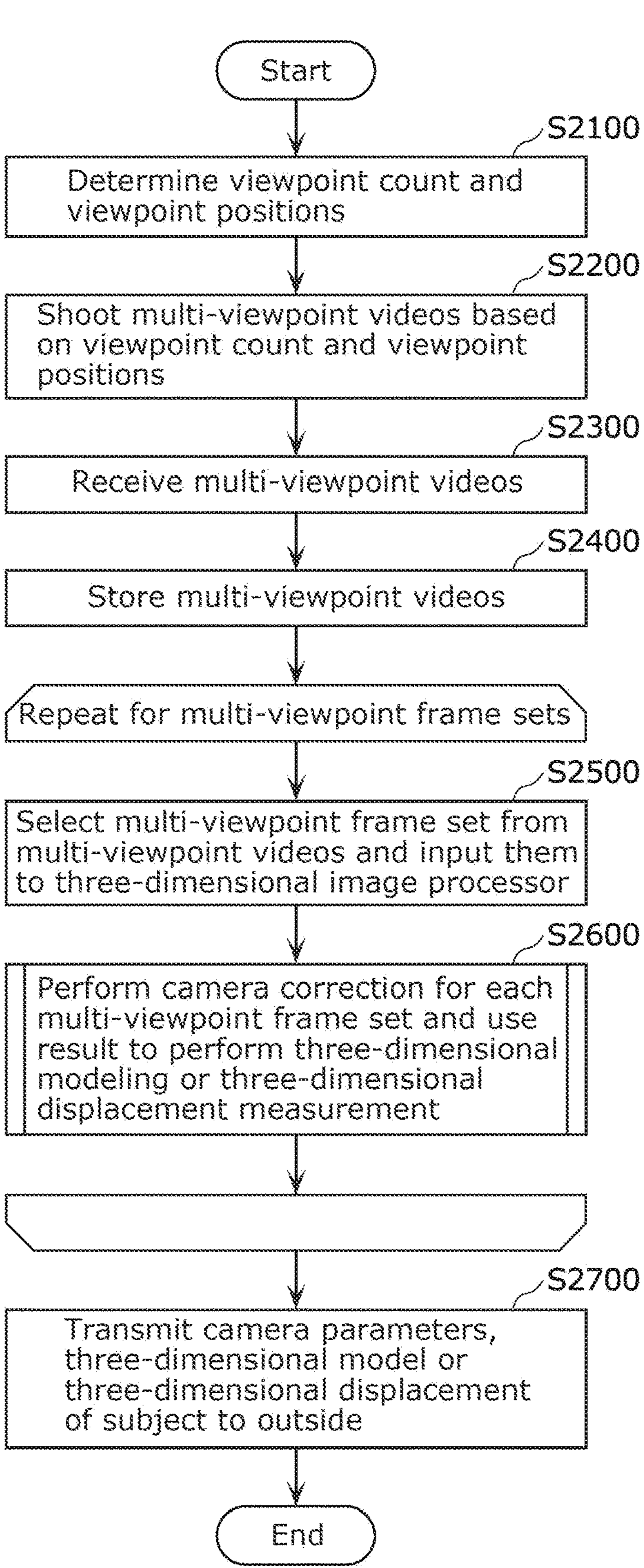
FIG. 6 is a flowchart of a three-dimensional reconstruction system in an embodiment.

FIG. 6 is a flowchart of the three-dimensional reconstruction system in an embodiment.

First, controller 300 determines the viewpoint count and the viewpoint positions to be used by three-dimensional reconstruction system 3 for performing at least one of types of processing including the camera correction, the three-dimensional modeling, and the three-dimensional displacement measurement (step S2100). How to determine the viewpoint count and the viewpoint positions will be described below in detail.

Next, cameras 100-1 to **100-*n* shoot multi-viewpoint videos of a subject based on the viewpoint count and the viewpoint positions determined by controller 300 (step S2200**).

Then, receiver 210 receives multi-viewpoint videos shot by a plurality of cameras out of cameras 100-1 to **100-*n* and inputs the multi-viewpoint videos to storage 220 (step S2300**).

Subsequently, storage 220 stores the inputted multi-viewpoint video (step S2400).

Next, acquisition circuit 230 selects frames from the stored multi-viewpoint videos based on the viewpoint count and the viewpoint positions determined by controller 300 and inputs the selected frames to three-dimensional image processor 240 as a multi-viewpoint frame set (step S2500).

Here, the multi-viewpoint frame set may be constituted by a plurality of frames in which one frame is selected from each of all videos shot by cameras 100-1 to **100-*n*. Alternatively, the multi-viewpoint frame set may be constituted by a plurality of frames in which at least one frame is selected from all videos shot by cameras 100-1 to 100-*n***. Alternatively, the multi-viewpoint frame set may be constituted by a plurality of frames in which one frame is selected from each of at least two videos selected from the multi-viewpoint videos. Alternatively, the multi-viewpoint frame set may be constituted by a plurality of frames in which at least one frame is selected from each of at least two videos selected from the multi-viewpoint videos.

Note that, when camera-specific information is not added to each frame of the multi-viewpoint frame set, camera-specific information may be added separately to the header information of each frame, or all together to the header information of the multi-viewpoint frame set.

Furthermore, when an index number indicating shooting time or shooting order is not added to each frame of the multi-viewpoint frame set, an index number indicating shooting time or shooting order may be added separately to the header information of each frame. In the same situation, an index number indicating shooting time or shooting order may be added all together to the header information of the multi-viewpoint frame set.

Then, three-dimensional image processor 240 uses the inputted multi-viewpoint frame set to perform the camera correction, and uses the result of the camera correction to perform the three-dimensional modeling or the three-dimensional displacement measurement (step S2600). The three-dimensional modeling or the three-dimensional displacement measurement will be described below in detail.

Moreover, the processing of steps S2500 and S2600 are repeatedly performed for each multi-viewpoint frame set. Here, in step S2500 and step S2600 repeatedly performed, the camera correction may be performed only once. In that case, the result of the camera correction performed once in the beginning may be repeatedly used in step S2500 and step S2600 repeatedly performed.

Subsequently, transmitter 250 transmits the camera parameters, the three-dimensional model of the subject, or the three-dimensional displacement of the subject to the outside of three-dimensional displacement measuring device 2000 (step S2700).

Here, three-dimensional reconstruction system 3 ends the processing.

Note that the camera parameters, the three-dimensional model of the subject or the three-dimensional displacement of the subject calculated in step S2600 may be used in processing after step S2600.

The camera parameters, the three-dimensional model of the subject, or the three-dimensional displacement of the subject outputted in step S2700 may be stored in storage 220.

Figure 7:
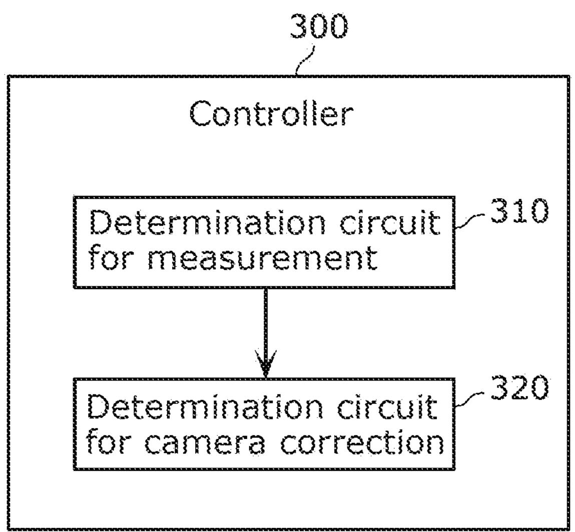
FIG. 7 is a block diagram of a controller in an embodiment.

FIG. 7 is a block diagram of the controller in an embodiment. Controller 300 include determination circuit 310 for measurement and determination circuit 320 for camera correction. Determination circuit 310 for measurement and determination circuit 320 for camera correction may be implemented as a processor and a memory or may be implemented as a dedicated logic circuit.

Determination circuit 310 for measurement determines the viewpoint count and viewpoint positions etc. of shooting two-dimensional images used by three-dimensional reconstruction system 3 to perform the three-dimensional displacement measurement of subject 1001.

Moreover, determination circuit 320 for camera correction determines the viewpoint count and viewpoint positions etc. of shooting two-dimensional images used by three-dimensional reconstruction system 3 to perform the camera correction.

Note that the viewpoint counts used for performing the camera correction, the three-dimensional modeling, and the three-dimensional displacement measurement by three-dimensional reconstruction system 3 may be different from one another. Alternatively, controller 300 may determine the viewpoint positions only. That is, determination circuit 310 for measurement may determine only the viewpoint positions of shooting two-dimensional images used by three-dimensional reconstruction system 3 to perform the three-dimensional displacement measurement of subject 1001. Moreover, determination circuit 320 for camera correction may determine only the viewpoint positions of shooting two-dimensional images used by three-dimensional reconstruction system 3 to perform the camera correction.

Note that controller 300 may determine the viewpoint count and the viewpoint positions of cameras before the cameras are introduced to three-dimensional displacement measuring device 2000. Moreover, the cameras may be introduced in accordance with the viewpoint count and the viewpoint positions of cameras determined by controller 300.

Note that controller 300 determines viewpoint count N used for the three-dimensional displacement measurement and viewpoint count M used for the camera correction such that a relation M>N is satisfied. Moreover, controller 300 further determines viewpoints used for the three-dimensional displacement measurement and viewpoints used for the camera correction such that the viewpoints used for the three-dimensional displacement measurement is included in the viewpoints used for the camera correction (that is, the two kinds of the viewpoints match).

Cameras 100-1 to **100-*n* or acquisition circuit 230** uses N fixed cameras as N viewpoints used for the three-dimensional displacement measurement. In other words, at M-N viewpoints, shooting with cameras is not performed for the three-dimensional displacement measurement. Moreover, as (M-N) viewpoints, which are M viewpoints used for the camera correction other than the N viewpoints used for the three-dimensional displacement measurement, (M-N) fixed cameras may be used, or at most (M-N) moving cameras may be used. When at most (M-N) moving cameras are used, the at most (M-N) moving cameras perform shooting while moving, so as to perform shooting from at least (M-N) viewpoints. Moreover, the (M-N) viewpoints, which are M viewpoints used for the camera correction other than the N viewpoints used for the three-dimensional displacement measurement, may be implemented by combining fixed cameras and moving cameras.

Figure 8:
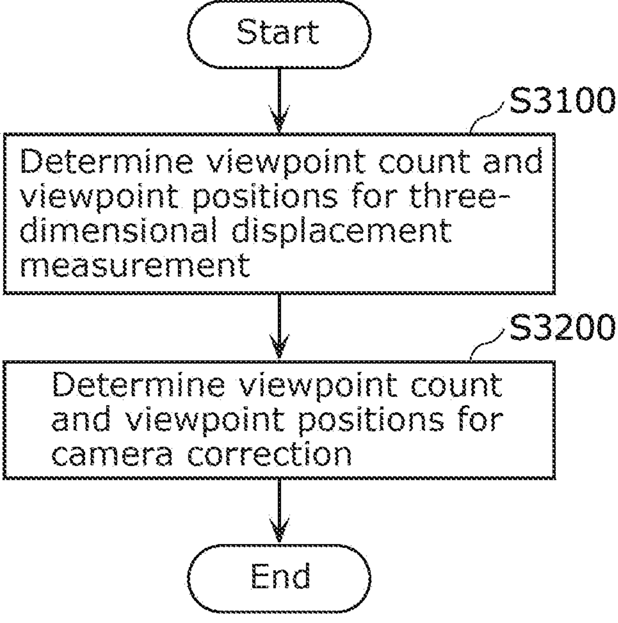
FIG. 8 is a flowchart illustrating the operation of the controller in an embodiment.

Next, operation of controller 300 will be described. FIG. 8 is a flowchart illustrating the operation of the controller in an embodiment.

First, determination circuit 310 for measurement determines the viewpoint count and viewpoint positions for the three-dimensional displacement measurement (step S3100).

Next, determination circuit 320 for camera correction determines the viewpoint count and viewpoint positions for the camera correction (step S3200). In this situation, determination circuit 320 for camera correction makes a setting such that viewpoint count M for the camera correction is greater than viewpoint count N for the three-dimensional displacement measurement and makes a setting such that the viewpoints for the three-dimensional displacement measurement are included in the viewpoints for the camera correction.

Here, controller 300 ends the operation. Note that, in step S3100, determination circuit 310 for measurement may determine the viewpoint count and viewpoint positions for the three-dimensional modeling.

Figure 9:
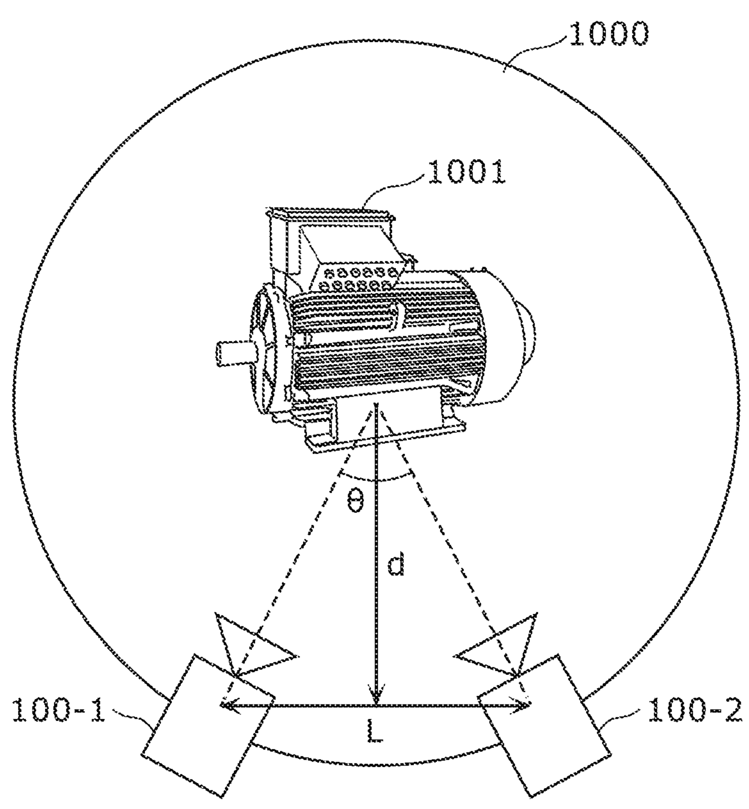
FIG. 9 is a diagram illustrating a baseline length, a distance between a shooting target and cameras, and an angle of convergence used in the three-dimensional displacement measurement in an embodiment.

Next, an example of a method for determining viewpoints by controller 300 will be described. First, the determination of viewpoint count N for the three-dimensional displacement measurement will be described with reference to FIG. 9. FIG. 9 is a diagram illustrating a baseline length used in the three-dimensional displacement measurement in an embodiment, a distance between a shooting target and cameras, and an angle of convergence. FIG. 9 illustrates a positional relationship between subject 1001 being the shooting target and cameras 100-1 and 100-2 being two of n cameras 100-1 to **100-*n***.

Controller 300 sets the viewpoint count used for the three-dimensional displacement measurement as N, the distance between subject 1001 and cameras 100-1 and 100-2 as d, and an accuracy of the three-dimensional modeling or the three-dimensional displacement measurement as $\Delta z$. These values are determined to be any values. Viewpoint count N may be the number of cameras that can be used for the three-dimensional displacement measurement or a maximum number within a settable range. In the following description, viewpoint count N is assumed to be equal to number n of cameras 100. However, viewpoint count N need not necessarily be equal to number n of cameras 100. Moreover, distance d between subject 1001 and cameras 100-1 and 100-2 may be determined based on at least one of the size of shooting space 1000 and how subject 1001 is depicted in two-dimensional images shot by cameras 100-1 and 100-2, etc. Here, distance d is a shortest distance from a line passing positions of two cameras 100-1 and 100-2 to subject 1001 as illustrated in FIG. 9. However, distance d is not limited to the example illustrated in FIG. 9. For example, distance d may be an average value of distances from subject 1001 to two cameras 100-1 and 100-2. Controller 300 uses accuracy $\Delta z$ of the three-dimensional modeling or the three-dimensional displacement measurement, focal distance f of cameras, element gap $\Delta H$ of cameras, and distance d between subject 1001 and two cameras 100-1 and 100-2 to calculate baseline length L that is an interval between two cameras 100-1 and 100-2 from Equation (8).

$$L=(d\times d\times \Delta H)/f\times \Delta z \quad \text{Equation (8)}$$

For example, when N=2 where N is the viewpoint count used for the three-dimensional displacement measurement, the number of cameras used for the three-dimensional displacement measurement is two. In this situation, controller 300 uses baseline length L and distance d between the subject and the cameras as information to determine viewpoint positions of the two cameras.

When viewpoint count N used for the three-dimensional displacement measurement is more than two, controller 300 performs the following calculation. First, letting an angle of convergence of optical axes of the two cameras be θ, controller 300 calculates θ using baseline length L and distance d from Equation (9).

$$\theta=2\arctan(L/2d) \quad \text{Equation (9)}$$

Moreover, controller 300 calculates value P from Equation (10). Here, value P is a value that is determined in accordance with angle θ of convergence and indicates the number of cameras used by three-dimensional reconstruction system 3.

$$P=\text{floor}(2\pi/\theta) \quad \text{Equation (10)}$$

When P is greater than N, controller 300 calculates N from Equation (11).

$$N=P \quad \text{Equation (11)}$$

In the above way, controller 300 determines viewpoint count N based on the camera parameters and determined accuracy $\Delta z$.

Moreover, baseline length L, distance d, and angle θ of convergence may be used as information to determine the viewpoint positions of the cameras.

Note that the positional relationship between subject 1001 and two cameras 100-1 and 100-2 described above is not limited to that between two cameras 100-1 and 100-2 and holds true for any other combinations of two of n cameras 100-1 to **100-*n***.

Figure 10:
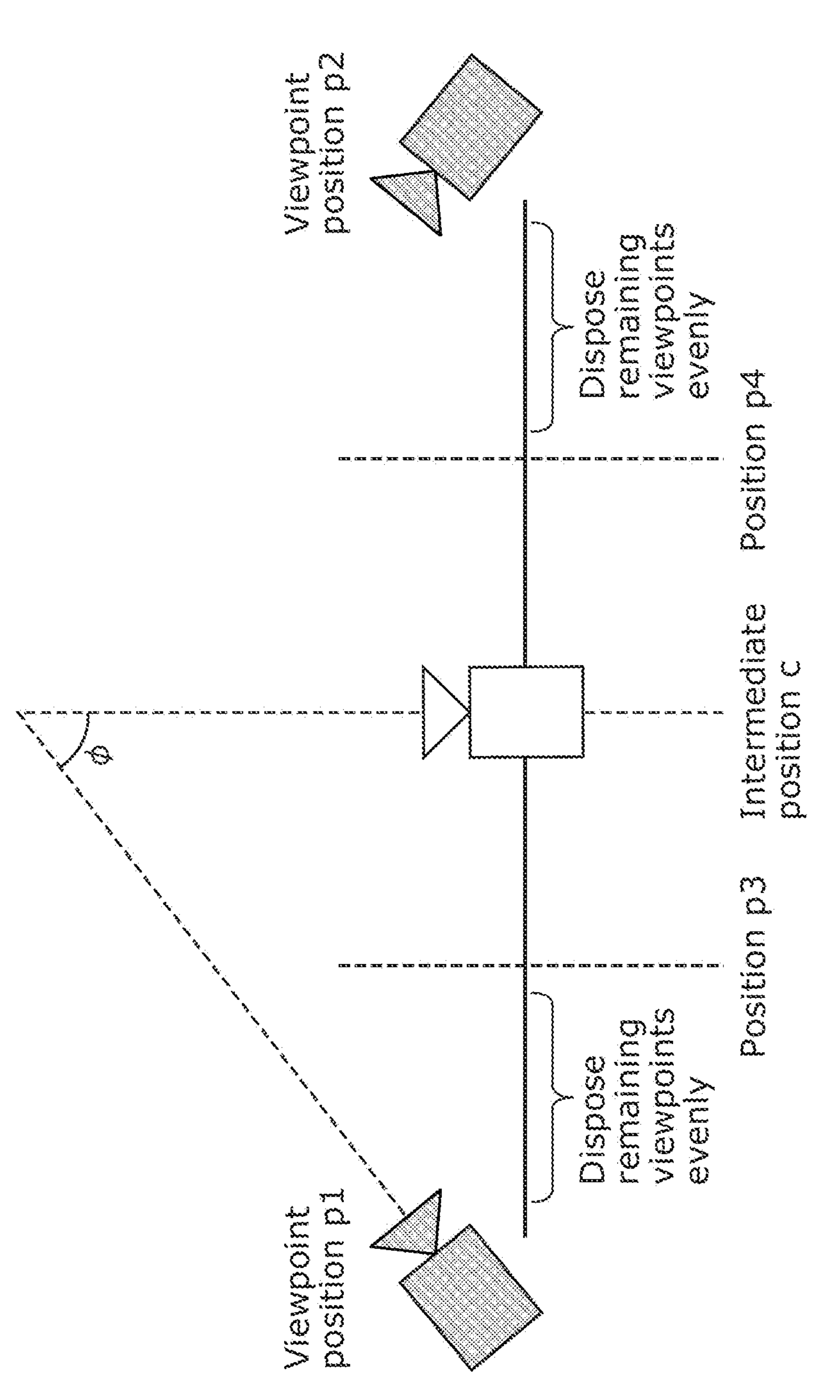
FIG. 10 is a diagram illustrating a method for determining viewpoint positions used for camera correction in an embodiment.

FIG. 10 is a diagram illustrating a method for determining viewpoint positions used for camera correction in an embodiment. Note that FIG. 10 is a diagram in which a plurality of cameras are viewed along a vertical direction. First, controller 300 optionally sets angle θ of convergence between viewpoints used for the camera correction. Here, when $\theta>2\pi-(N-1)\times\theta$, controller 300 calculates viewpoint count M used for the camera corrections from Equation (12).

$$M=N+\text{floor}(\theta/\phi)\times(N-1) \quad \text{Equation (12)}$$

Here, floor(θ/ϕ) viewpoints are added between every two adjacent viewpoints of the N viewpoints used for the three-dimensional displacement measurement. The added floor(θ/ϕ) viewpoints are added between every two adjacent viewpoints of the N viewpoints used for the three-dimensional displacement measurement as illustrated in FIG. 10. For example, controller 300 adds one or two viewpoints at intermediate position c between viewpoint position p1 and viewpoint position p2. Here, controller 300 determines a position bisecting a distance between viewpoint position p1 and intermediate position c as position p3 and determines a position bisecting a distance between viewpoint position p2 and intermediate position c as position p4. Controller 300 then disposes as many viewpoints as the number resulting from subtracting the viewpoint count put at intermediate position c from floor(θ/ϕ), between viewpoint position p1 and position p3. Likewise, controller 300 disposes as many viewpoints as the number resulting from subtracting the viewpoint count put at intermediate position c from floor(θ/ϕ), between viewpoint position p2 and position p4. By this arrangement, for example, a large majority of the added viewpoints are placed, when viewed from a midpoint of cameras disposed at positions corresponding to viewpoints used for the three-dimensional displacement measurement, at positions closer to the cameras disposed at the positions corresponding to the viewpoints used for the three-dimensional displacement measurement than the midpoint. That is, viewpoints for the correction disposed between position p3 (p4) and viewpoint position p1 (p2) outnumber viewpoints for the correction disposed between intermediate position c and position p3 (p4). In another arrangement example, no viewpoints for the correction are disposed between position p3 (p4) and intermediate position c.

Therefore, in the three-dimensional displacement measuring method, the viewpoints used for the camera correction are set more within ranges closer to position p3 (p4) than within ranges away from position p3 (p4) with respect to the positions of the viewpoints used for the three-dimensional displacement measurement. Such an uneven arrangement improves an accuracy of the camera correction.

Figure 11:
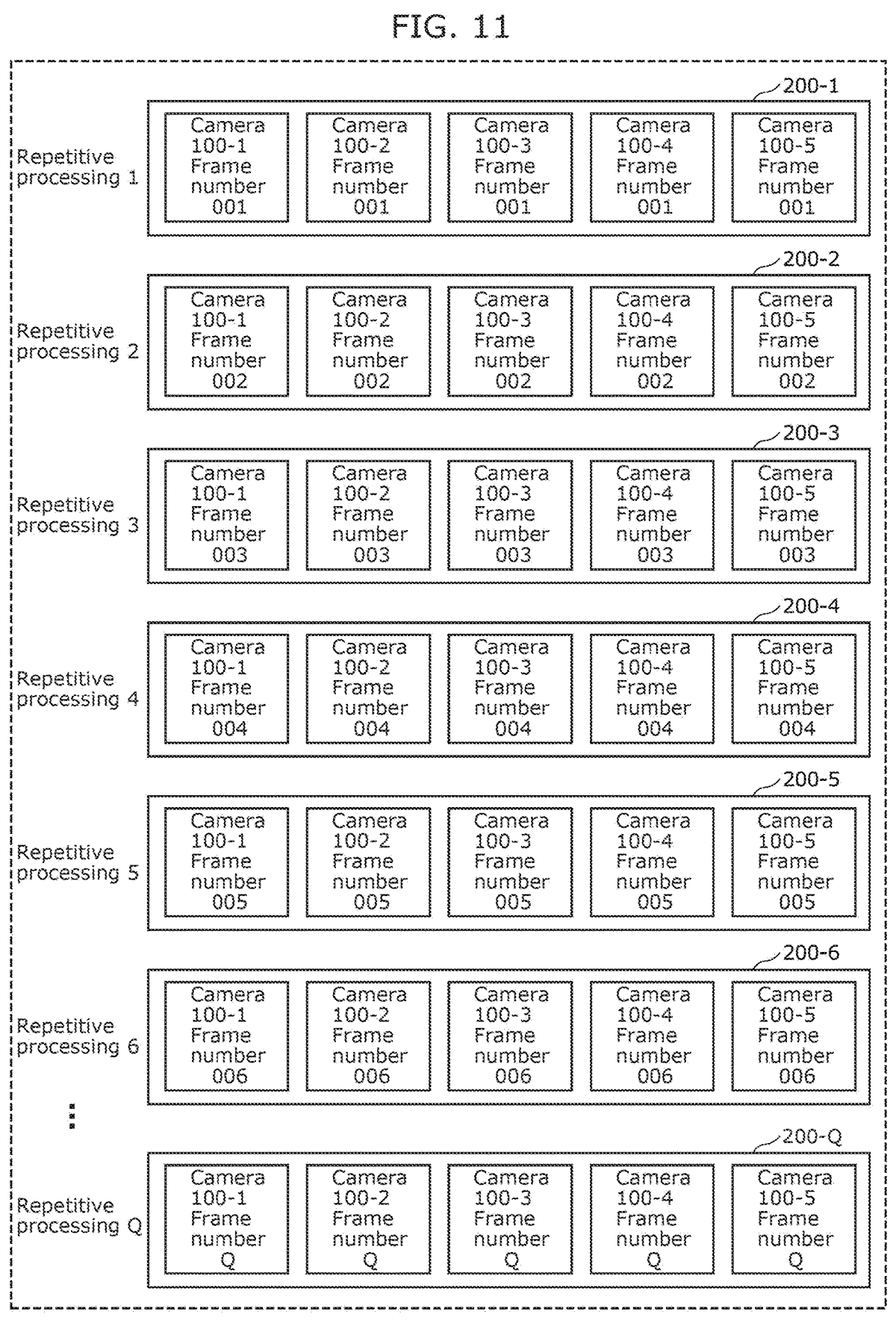

Next, the multi-viewpoint frame set will be described in detail. FIG. 11 is a diagram illustrating an example of a multi-viewpoint frame set in an embodiment. Here, an example in which the multi-viewpoint frame set is determined by acquisition circuit 230 selecting one frame from each of 5 cameras 100-1 to 100-5 will be described.

Moreover, it is supposed that synchronous shooting is performed by a plurality of cameras. Camera IDs to identify the cameras with which shooting are performed are given as 100-1 to 100-5 to the header information of each frame. Moreover, frame numbers 001 to Q indicating a shooting order in each camera are given to the header information of each frame indicating that subject 1001 at a same time is shot in frames having the same frame number between cameras.

Acquisition circuit 230 successively outputs multi-viewpoint frame sets 200-1 to 200-Q to three-dimensional image processor 240. Three-dimensional image processor 240 successively performs the three-dimensional modeling or the three-dimensional displacement measurement by repetitive processing using multi-viewpoint frame sets 200-1 to 200-Q.

Multi-viewpoint frame set 200-1 is constituted by five frames of frame number 001 of camera 100-1, frame number 001 of camera 100-2, frame number 001 of camera 100-3, frame number 001 of camera 100-4, and frame number 001 of camera 100-5. These five frames are used as a first set of frames of multi-viewpoint video in repetitive processing 1 by three-dimensional image processor 240. That is, in repetitive processing 1, a three-dimensional model at a time when frame number 001 is shot is reconstructed, or a three-dimensional displacement at the time is measured.

In the example illustrated in FIG. 11, frame numbers are updated in all the cameras in multi-viewpoint frame set 200-2. Multi-viewpoint frame set 200-2 is constituted by five frames of frame number 002 of camera 100-1, frame number 002 of camera 100-2, frame number 002 of camera 100-3, frame number 002 of camera 100-4, and frame number 002 of camera 100-5. These five frames are used in repetitive processing 2 by three-dimensional image processor 240. That is, in repetitive processing 2, a three-dimensional model at a time when frame number 002 is shot is reconstructed, or a three-dimensional displacement at the time is measured.

In and after repetitive processing 3 as well, frame numbers are updated in all the cameras as in repetitive processing 2. This allows three-dimensional reconstruction system 3 to reconstruct a three-dimensional model of subject 1001 at each time and allows three-dimensional reconstruction system 3 to measure a three-dimensional displacement of subject 1001 at each time.

However, since the three-dimensional reconstruction is performed independently at each time, the coordinate axes and scales of the reconstructed plurality of three-dimensional models do not necessarily coincide with each other. That is, to acquire a three-dimensional model of subject 1001 moving, it is necessary to match the coordinate axes and scales at each time.

In that case, each frame is given a shooting time and, based on the shooting time, acquisition circuit 230 creates a multi-viewpoint frame set by combining synchronous frames with asynchronous frames. A discrimination method of a synchronous frame and an asynchronous frame by using the shooting time between two cameras will be described below.

Let a shooting time of a frame selected from camera 100-1 be T1, a shooting time of a frame selected from camera 100-2 be T2, an exposure time of camera 100-1 be TE1, and an exposure time of camera 100-2 be TE2. Shooting times T1, T2 each refer to a time at which exposure is started in examples of FIGS. 4A and 4B, that is, a time at which a rectangular signal rises up.

In this case, the exposure end time of camera 100-1 is T1+TE1. Here, if Equation (13) or Equation (14) holds, two cameras 100-1 and 100-2 are considered to be shooting subject 1001 of a same time, and it is discriminated that two frames are synchronous frames.

$$T1 \leq T2 \leq T1 + TE1 \qquad \text{Equation (13)}$$

$$T1 \leq T2 + TE2 \leq T1 + TE1 \qquad \text{Equation (14)}$$

Note that when cameras 100-1 to 100-*n* shot multi-viewpoint videos based on the viewpoint count and the viewpoint positions determined by controller 300, acquisition circuit 230 may use frames as many as the number of inputted multi-viewpoint videos as a multi-viewpoint frame set. In contrast, when cameras 100-1 to 100-*n* shot multi-viewpoint videos irrespective of the viewpoint count or the viewpoint positions determined by controller 300, acquisition circuit 230 may select videos corresponding to the viewpoint count or the viewpoint positions determined by controller 300 to create a multi-viewpoint frame set.

That is, three-dimensional displacement measuring device 2000 creates, at each of different times, a set of N images shot by N cameras. For each of the sets, three-dimensional displacement measuring device 2000 measures three-dimensional position of subject 1001 at a time of the set using the N images and camera parameters included in the set.

Figure 12:
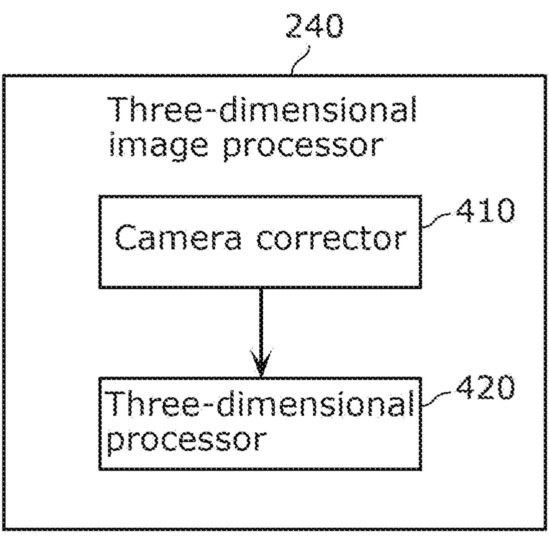
FIG. 12 is a block diagram of a three-dimensional image processor in an embodiment.

FIG. 12 is a block diagram of the three-dimensional image processor in an embodiment. Three-dimensional image processor 240 includes camera corrector 410 and three-dimensional processor 420. Note that three-dimensional processor 420 is a specific example of a displacement measurer.

Camera corrector 410 performs the camera correction. Specifically, camera corrector 410 calculates intrinsic parameters, extrinsic parameters, and a lens distortion coefficient of each of the plurality of cameras 100-1 to 100-*n* as camera parameters. The intrinsic parameters indicate optical system properties of a camera such as a focal distance, an aberration, and an image center. The extrinsic parameters indicate a position and an orientation of a camera in a three-dimensional space.

Camera corrector 410 may separately calculate the intrinsic parameters, the extrinsic parameters, and the lens distortion coefficient using M correction images that are M frames obtained by the plurality of cameras 100-1 to 100-*n* shooting intersections of black and white on a checkerboard or may perform total optimization by calculating the intrinsic parameters, the extrinsic parameters, and the lens distortion coefficient all together using corresponding points between M frames like Structure from Motion. In the latter case, the M frames need not be images obtained by shooting the checkerboard.

Three-dimensional processor 420 uses the multi-viewpoint frame set and the camera parameters to perform three-dimensional processing such as the three-dimensional modeling of subject 1001 and the three-dimensional displacement measurement of subject 1001. Specifically, three-dimensional processor 420 creates a model of subject 1001 from three-dimensional points using the multi-viewpoint frame set and the result of the camera correction, as the three-dimensional modeling. Instead of the three-dimensional modeling, three-dimensional processor 420 may measure a three-dimensional displacement of subject 1001 using the multi-viewpoint frame set and the result of the camera correction, as the three-dimensional displacement measurement. When measuring the three-dimensional displacement, three-dimensional processor 420 may use data on a three-dimensional point of the three-dimensional model of subject 1001 that is created by the three-dimensional modeling. Here, the three-dimensional point used for the three-dimensional displacement measurement may be any point of subject 1001.

Three-dimensional image processor 240 as well as camera corrector 410 and three-dimensional processor 420 constituting three-dimensional image processor 240 are implemented as a processor and a memory. Alternatively, these may be implemented as a dedicated logic circuit.

Figure 13:
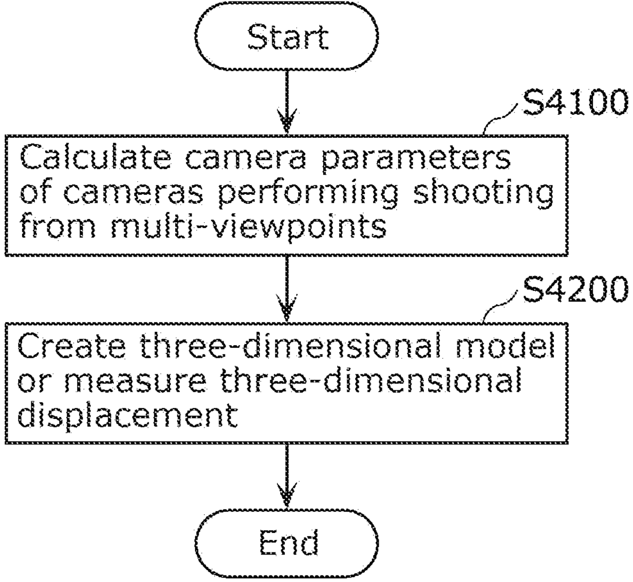
FIG. 13 is a flowchart illustrating the operation of the three-dimensional image processor in an embodiment.

FIG. 13 is a flowchart illustrating the operation of the three-dimensional image processor in an embodiment. Note that, in the processing illustrated in FIG. 13, a multi-viewpoint frame set of the viewpoint count determined by controller 300 is used.

First, camera corrector 410 uses a multi-viewpoint frame set corresponding to viewpoint count M and the viewpoint positions determined by controller 300 to calculate camera parameters of cameras present at the viewpoints at which shooting is performed (step S4100). Here, controller 300 may calculate the camera parameters for at least N cameras. Note that step S4100 is an example of a step of calculating camera parameters.

Next, three-dimensional processor 420 uses the multi-viewpoint frame set corresponding to viewpoint count N and the viewpoint positions determined by controller 300, and the camera parameters calculated by camera corrector 410 to create the three-dimensional model of subject 1001 or measure the three-dimensional displacement of subject 1001 (step S4200). Here, three-dimensional processor 420 is a specific example of a displacement measurer. Note that step S4200 is an example of a step of measuring a displacement.

Note that the viewpoint count used as a reference in the present embodiment is viewpoint count N used for the three-dimensional modeling or the three-dimensional displacement measurement. For example, viewpoint count N is equal to the number of cameras that are installed in shooting space 1000 all the time.

Furthermore, an accuracy of the camera parameters calculated in step S4100 has a significant influence on an accuracy of the creation of the three-dimensional model of subject 1001 or the measurement of the three-dimensional displacement of subject 1001 performed in step S4200. Therefore, to increase the accuracy of the camera parameters, in step S4100, viewpoint count M, which is greater than viewpoint count N used in step S4200, is used. In this situation, the number of cameras is not necessarily M. Moving cameras less than M in number may be used to perform shooting at a plurality of viewpoints, and stationary regions in shot images may be used for the camera correction. The stationary regions are regions where a stationary object is depicted in the images, other than moving regions where a moving object is depicted.

Furthermore, three-dimensional displacement measuring device 2000 may perform the three-dimensional displacement measurement as well as the three-dimensional modeling in three-dimensional image processor 240 as described above, and may further perform free-viewpoint video generation.

The free-viewpoint video generation performed by three-dimensional displacement measuring device 2000 in an embodiment will be described below.

Three-dimensional displacement measuring device 2000 can reconstruct a time-series three-dimensional model whose coordinate axes are consistent between times. Specifically, first, three-dimensional displacement measuring device 2000 acquires a three-dimensional model at each time by performing three-dimensional reconstruction independently at each time. Next, three-dimensional displacement measuring device 2000 detects a stationary camera and a stationary object (stationary three-dimensional point) and performs coordinate matching of three-dimensional model between times using the detected stationary camera and stationary object, thereby generating a time-series three-dimensional model whose coordinate axes are consistent between times.

Figure 14:
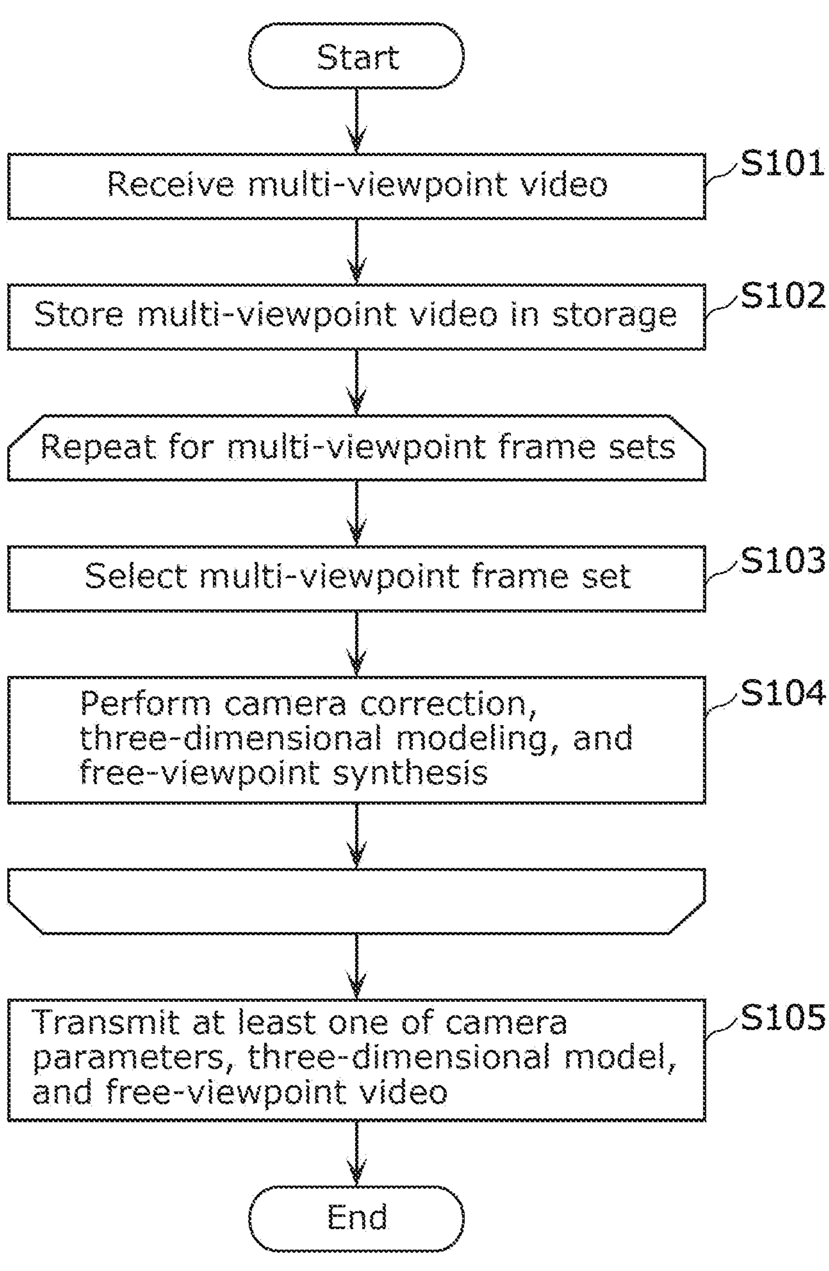
FIG. 14 is a flowchart illustrating the operation of the three-dimensional displacement measuring device according to an embodiment when performing the free-viewpoint video generation.

Next, operation of three-dimensional displacement measuring device 2000 when performing the free-viewpoint video generation will be described. FIG. 14 is a flowchart illustrating the operation of three-dimensional displacement measuring device 2000 according to the present embodiment when performing the free-viewpoint video generation.

First, receiver 210 receives a multi-viewpoint video shot by a plurality of cameras 100-1 to **100-*n* (S101). Storage 220 stores the received multi-viewpoint video (S102**).

Next, acquisition circuit 230 selects frames from multi-viewpoint video and outputs them to three-dimensional image processor 240 as a multi-viewpoint frame set (S103). Note that the multi-viewpoint frame set selected here may have a same configuration as the multi-viewpoint frame set that is selected in step S2500 of FIG. 6.

Next, three-dimensional image processor 240 uses the multi-viewpoint frame set to perform camera correcting processing, three-dimensional modeling processing, and free-viewpoint video synthesizing processing, thereby generating the free-viewpoint video (S104).

Moreover, the processing of steps S103 and S104 are repeatedly performed for each multi-viewpoint frame set.

Finally, transmitter 250 transmits at least one of the camera parameters, the three-dimensional model of a subject, and the free-viewpoint video to an external apparatus (S105).

Next, the free-viewpoint video generation by three-dimensional image processor 240 will be described in detail.

As described with reference to FIG. 7 to FIG. 10, controller 300 determines an optimum viewpoint count for each type of the processing by camera corrector 410 and three-dimensional processor 420. The viewpoint count determined here indicates the viewpoint count different from one another.

The accuracy of the camera parameters calculated in the camera correcting processing has a significant influence on accuracies of the three-dimensional modeling processing and the free-viewpoint video synthesizing processing. Therefore, in order not to decrease the accuracies of the three-dimensional modeling processing and the free-viewpoint video synthesizing processing, controller 300 determines viewpoint count M, which is greater than viewpoint count N for the three-dimensional modeling processing, as the viewpoint count of the multi-viewpoint frame set used for the camera correcting processing to improve the accuracy of the camera parameters. That is, controller 300 causes camera corrector 410 to perform the camera correcting processing on M frames resulting from adding k frames shot by a non-fixed cameras (k is an integer equal to or greater than a) to N frames shot by n cameras 100-1 to **100-*n***. Note that the a non-fixed cameras are not necessarily k in number, and the k frames may be k frames (images) resulting from shooting at k viewpoints by moving the a non-fixed cameras.

Moreover, in the free-viewpoint video synthesizing processing, calculation of corresponding positions between images obtained by real cameras and images at virtual viewpoints involves a processing load that becomes heavy with an increase in the number of the real cameras and thus takes a long processing time. At the same time, of n cameras 100-1 to **100-*n*, a plurality of images obtained by a plurality of cameras disposed at positions close to one another provide pieces of texture information that resemble one another. For that reason, using all of the plurality of images for the free-viewpoint video synthesizing processing differs little from using one of the plurality of images in accuracy of a result obtained by the free-viewpoint video synthesizing processing. Therefore, controller 300** determines viewpoint count I, which is less than viewpoint count N for the three-dimensional modeling processing, as the viewpoint count of the multi-viewpoint frame set used for the free-viewpoint video synthesizing processing.

Figure 15:
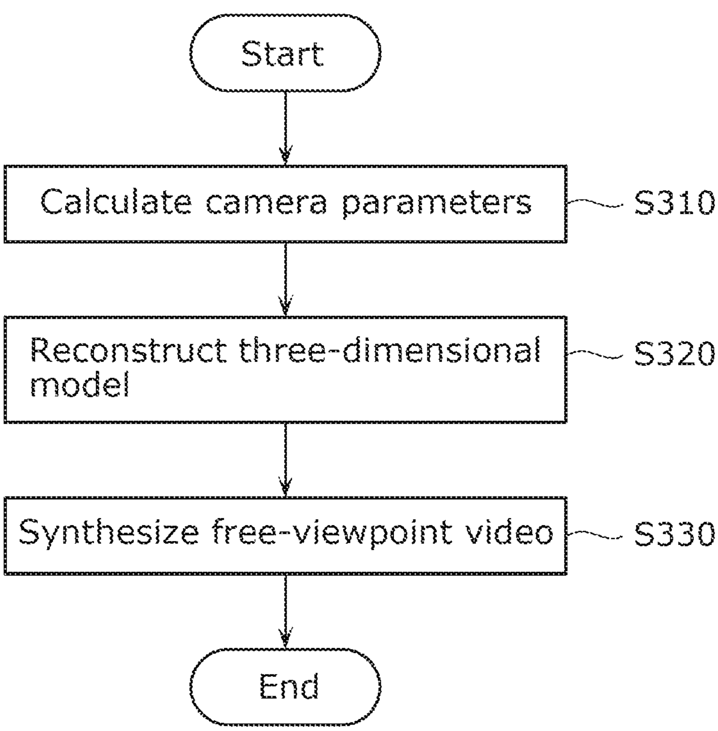
FIG. 15 is a flowchart illustrating the operation of the three-dimensional image processor when performing the free-viewpoint video generation.

FIG. 15 is a flowchart illustrating the operation of three-dimensional image processor 240 when performing the free-viewpoint video generation.

First, camera corrector 410 calculates, as in step S4100, camera parameters of the plurality of cameras 100-1 to 100-*n* using M correction images shot at M different viewpoints by n cameras 100-1 to 100-*n* disposed at positions different from one another (S310). Note that the M viewpoints here is based on the viewpoint count determined by controller 300.

Note that camera corrector 410 performs the camera correcting processing using M correction images obtained by n cameras 100-1 to 100-*n* including fixed cameras and non-fixed cameras. In the camera correcting processing, distances between cameras decrease with an increase in the number of the cameras, and visual fields of a plurality of cameras at short distances from one another are close to one another; therefore, a plurality of images obtained from the plurality of cameras at short distances from one another are easily associated with one another. Therefore, when performing the camera correction, camera corrector 410 increases the viewpoint count by using non-fixed cameras in addition to the fixed cameras that are installed in shooting space 1000 all the time.

The non-fixed cameras may be at least one moving camera; when moving cameras are used as the non-fixed cameras, images at different shooting timings are to be included. That is, the M correction images used for the camera correcting processing are to include images shot at different timings. In other words, a multi-viewpoint frame set of M viewpoints constituted by the M correction images includes frames obtained from asynchronous shooting. For that reason, camera corrector 410 performs the camera correcting processing using corresponding points between images of feature points obtained from stationary regions, which are regions where a stationary object is depicted, from the M correction images. Therefore, camera corrector 410 calculates camera parameters for the stationary regions. The stationary regions are regions of the M correction images without moving regions where a moving object is depicted. The moving regions depicted in frames are detected by, for example, calculating a difference from a past frame, calculating a difference from a background picture, or automatically detecting a region of a moving object by machine learning, etc.

Note that, in the free-viewpoint video generating processing by three-dimensional image processor 240, camera corrector 410 need not perform the camera correcting processing in step S310 every time and may perform the camera correcting processing every predetermined times.

Next, three-dimensional processor 420 reconstructs a three-dimensional model using N images for three-dimensional processing shot by n cameras 100-1 to 100-*n* and the camera parameters obtained by the camera correcting processing (S320). That is, three-dimensional processor 420 reconstructs the three-dimensional model using the N images for three-dimensional processing shot at N viewpoints based on viewpoint count N determined by controller 300. Three-dimensional processor 420 thus reconstructs a subject in the N images for three-dimensional processing as three-dimensional points. The N images for three-dimensional processing used in the three-dimensional modeling processing are images shot by n cameras 100-1 to 100-*n* at a given timing. That is, the multi-viewpoint frame set of the N viewpoints constituted by the N images for three-dimensional processing is a multi-viewpoint frame set obtained by synchronous shooting. For that reason, three-dimensional processor 420 performs the three-dimensional modeling processing using regions including a stationary object and a moving object (that is, the entire regions) of the N images for three-dimensional processing. Alternatively, three-dimensional processor 420 may use a result of measuring a position of a subject in a three-dimensional space by laser scanning, or may calculate the position of the subject in the three-dimensional space using corresponding points in a plurality of stereo images like multi-view stereo.

Next, three-dimensional processor 420 uses I third images shot by I cameras of n cameras 100-1 to 100-*n*, the camera parameters calculated by the camera correcting processing, and the three-dimensional model reconstructed by the three-dimensional modeling processing to synthesize a free-viewpoint video (S330). That is, three-dimensional processor 420 synthesizes the free-viewpoint video using the I third images shot at I viewpoints based on viewpoint count I determined by controller 300. Specifically, three-dimensional processor 420 synthesizes the free-viewpoint video by calculating pieces of texture information at virtual viewpoints using pieces of texture information from real cameras based on corresponding positions between images from the real cameras and images at the virtual viewpoints determined from the camera parameters and the three-dimensional model.

Advantageous Effects, Etc.

According to the three-dimensional displacement measuring method according to the present embodiment, it is possible to improve the accuracy of the three-dimensional displacement measuring processing by using viewpoint count M, which is greater than viewpoint count N for the three-dimensional displacement measuring processing, for the camera correcting processing to improve an accuracy of the camera parameters.

Moreover, in the three-dimensional displacement measuring method according to the present embodiment, a displacement over time of a three-dimensional point is determined using the technique of image matching and the principle of triangulation based on camera parameters of a high accuracy, a first corresponding point, and a second corresponding point. As a result, a displacement of a subject in a three-dimensional space can be determined effectively.

Furthermore, according to the three-dimensional displacement measuring method according to the present embodiment, it is possible to determine viewpoint count N of the cameras such that an accuracy of the measurement performed in the measuring of a displacement is satisfied. As a result, in the three-dimensional displacement measuring method, it is possible to determine a displacement of a subject in a three-dimensional space with accuracy.

Three-dimensional displacement measuring device 2000 according to the present embodiment determines, taking the fact that the accuracy of the camera parameters calculated by the camera correcting processing has a significant influence on the accuracies of the three-dimensional modeling processing and the free-viewpoint video synthesizing processing into consideration, viewpoint count M, which is greater than viewpoint count N for the three-dimensional modeling processing, as the viewpoint count of the multi-viewpoint frame set used for the camera correcting processing to improve the accuracy of the camera parameters. As a result, the accuracies of the three-dimensional modeling processing and the free-viewpoint video synthesizing processing can be improved.

Moreover, three-dimensional displacement measuring device 2000 according to the present embodiment determines viewpoint count I, which is less than viewpoint count N for the three-dimensional modeling processing, as the viewpoint count of the multi-viewpoint frame set used for the free-viewpoint video synthesizing processing and thus can decrease the processing load necessary for generating a free-viewpoint video.

(Variations)

Figure 16:
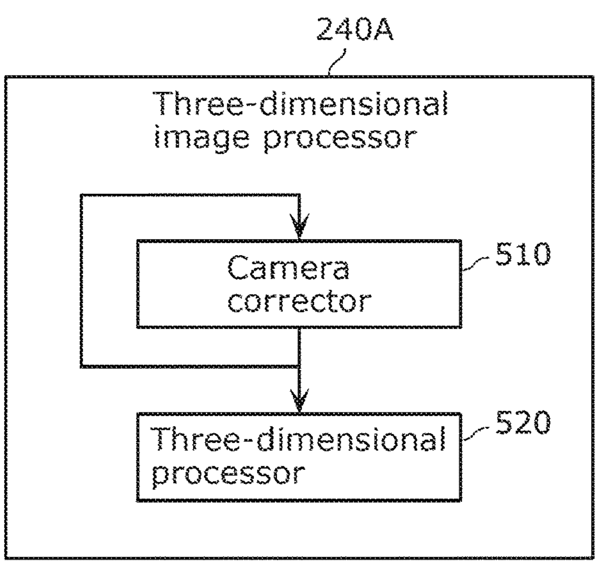
FIG. 16 is a block diagram of a variation of the three-dimensional image processor.

FIG. 16 is a block diagram of a variation of the three-dimensional image processor. In the variation of the present embodiment, three-dimensional image processor 240A includes camera corrector 510 and three-dimensional processor 520.

Camera corrector 510 has same function and configuration as camera corrector 410 but different from camera corrector 410 in the following regard. Camera corrector 510 receives an output of camera corrector 510 as a fed back input and performs its processing again based on the input. Three-dimensional processor 520 has same function and configuration as three-dimensional processor 420. Three-dimensional processor 520 performs its processing based on data that is finally output from camera corrector 510. Note that the final output from the camera corrector is, for example, an output from which a first output from the camera corrector is excluded.

Figure 17:
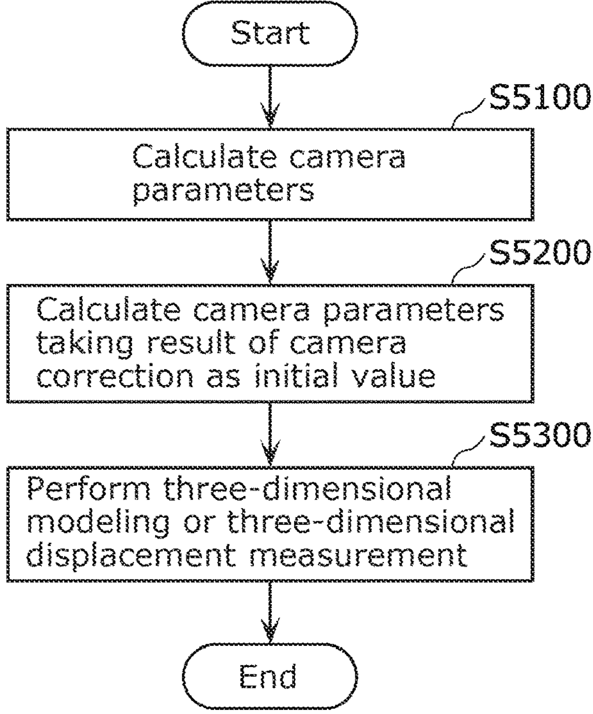
FIG. 17 is a flowchart illustrating the operation of a variation of the three-dimensional image processor.

FIG. 17 is a flowchart illustrating the operation of a variation of the three-dimensional image processor.

First, camera corrector 510 uses a multi-viewpoint frame set corresponding to the viewpoint count and the viewpoint positions determined by controller 300 to calculate camera parameters of cameras present at the viewpoints at which shooting is performed (step S5100).

Next, camera corrector 510 takes a value of a result of the camera correction performed in step S5100 as an initial value and uses a multi-viewpoint frame set corresponding to the viewpoint count and the viewpoint positions determined by controller 300 to calculate camera parameters of cameras present at the viewpoints at which shooting is performed (step S5200).

Next, three-dimensional processor 520 uses the multi-viewpoint frame set corresponding to the viewpoint count and the viewpoint positions determined by controller 300, and the camera parameters calculated by camera corrector 510 to perform the three-dimensional modeling of subject 1001 or the three-dimensional displacement measurement of the subject (step S5300).

In the camera correcting processing, distances between cameras decrease with an increase in the number of the cameras used for the camera correction. Regions of shooting space 1000 present in visual fields of cameras at short distances from one another are close to each other; therefore, images shot by the cameras are easily associated with one another. Therefore, when the camera correction is performed, non-fixed cameras are used in addition to fixed cameras that are installed in shooting space 1000 all the time to increase the viewpoint count used for the camera correction to more than the viewpoint count provided by the fixed cameras. Here, the non-fixed cameras may be at least one moving camera. However, when moving cameras are used as the non-fixed cameras, shooting times of images shot at different viewpoints differ from one another, and thus camera parameters only for stationary regions of the shot images are calculated.

In this situation, the calculated camera parameters do not necessarily support moving regions in images shot by the fixed cameras. Here, the moving regions are regions where a moving object is depicted in the images. Moreover, in a system such as Structure from Motion, total optimization is performed on the camera parameters. Therefore, when this system is used, the camera parameters are not necessarily optimized when attention is given only to the fixed cameras.

Therefore, in the present variation, two-stage camera correction is performed through two steps including step S5100 and step S5200.

First, in step S5100, camera corrector 510 performs rough camera correction using a multi-viewpoint frame set of B viewpoints including images shot by at least one camera other than A cameras that are installed in shooting space 1000 all the time.

Next, in step S5200, camera corrector 510 optimizes the camera parameters calculated by camera corrector 510 for an environment of the A cameras by using only the images shot by the A cameras that are installed in shooting space 1000 all the time. Here, the optimization may refer to performing processing that reprojects a three-dimensional point that is incidentally obtained in the calculation of the camera parameters onto the shot images, takes errors between the reprojected points and feature points detected on the images (reprojection error) as an evaluation value, and minimizes the evaluation value.

Note that the viewpoint count used in the camera correction in the second stage may be greater than number A of cameras that are installed in shooting space 1000 all the time. Moreover, the viewpoint count used in the camera correction in the second stage may be greater than the viewpoint count used for the three-dimensional image processing (for example, three-dimensional displacement measurement). However, the viewpoint count used in the camera correction in the second stage may be equal to the viewpoint count used for the three-dimensional image processing (for example, three-dimensional displacement measurement) or may be less than the viewpoint count.

In the above three-dimensional displacement measuring device, n cameras 100-1 to **100-*n* may include a stereo camera including two cameras. The stereo camera may be any stereo camera as long as the stereo camera includes two cameras that perform shooting in substantially a same direction, that is, includes a first camera and a second camera between which a distance is equal to or shorter than a predetermined distance. When n cameras 100-1 to 100-*n* are constituted by stereo cameras like this, n cameras 100-1 to 100-*n*** are constituted by n/2 first cameras and n/2 second cameras. Note that two cameras included in each stereo camera may be integrated together or may be separated from each other.

Moreover, the first camera and the second camera constituting each stereo camera may perform shooting with sensitivities different from each other. The first camera is a camera that performs shooting with a first sensitivity. The second camera is a camera that performs shooting with a second sensitivity, which is different from the first sensitivity. The first camera and the second camera are cameras having color sensitivities different from each other.

The three-dimensional processor reconstructs a three-dimensional model using n images for three-dimensional processing obtained by shooting by all of n cameras 100-1 to **100-*n***. Since the three-dimensional processor uses luminance information in the three-dimensional modeling processing, all of the n cameras can be used irrespective of differences in color sensitivity, and a three-dimensional model can be calculated with high accuracy.

The three-dimensional processor uses n/2 third images being a plurality of images obtained by shooting performed by the n/2 first cameras or the n/2 second cameras, the camera parameters calculated by the camera corrector, and the three-dimensional model reconstructed by the three-dimensional processor to synthesize a free-viewpoint video. In the free-viewpoint video generating processing, using n/2 images shot by either the n/2 first cameras or the n/2 second cameras by the three-dimensional processor has a minor influence on the accuracy. Hence, the three-dimensional processor performs free-viewpoint synthesis using n/2 images shot by either the first cameras or the second cameras in accordance with a situation of shooting space 1000. For example, suppose that the n/2 first cameras are cameras whose color sensitivity is high for colors in the red range, and the n/2 second cameras are cameras whose color sensitivity is high for colors in the blue range. In this case, the three-dimensional processor switches images to be used such that the free-viewpoint video synthesizing processing is performed using images shot by the first cameras whose color sensitivity is high for a red color when the color of a subject is a color in the red range, and using images shot by the second cameras whose color sensitivity is high for a blue color when the color of the subject is a color in the blue range.

The three-dimensional displacement measuring device performs free-viewpoint video synthesis using one of two types of images obtained by two types of cameras of different sensitivities, in accordance with a situation of shooting space. Therefore, the free-viewpoint video can be generated with high accuracy.

What is different between the first camera and the second camera is not limited to color sensitivity, and the first camera and the second camera may be cameras having luminance sensitivities different from each other. In this case, the three-dimensional processor can switch between the cameras in accordance with a situation such as whether it is daytime or nighttime and whether the sky is clear or cloudy.

Although the stereo cameras are used, the stereo cameras are not necessarily used. Therefore, the n cameras are not limited to those constituted by n/2 first cameras and n/2 second cameras and may be constituted by i first cameras and j second cameras.

The plurality of cameras 100-1 to **100-*n*** are constituted by the fixed cameras and the non-fixed cameras but are not limited to this, and all of the plurality of cameras may be constituted by fixed cameras. Moreover, the n images used for the three-dimensional modeling are images shot by fixed cameras but may include images shot by non-fixed cameras.

Figure 18:
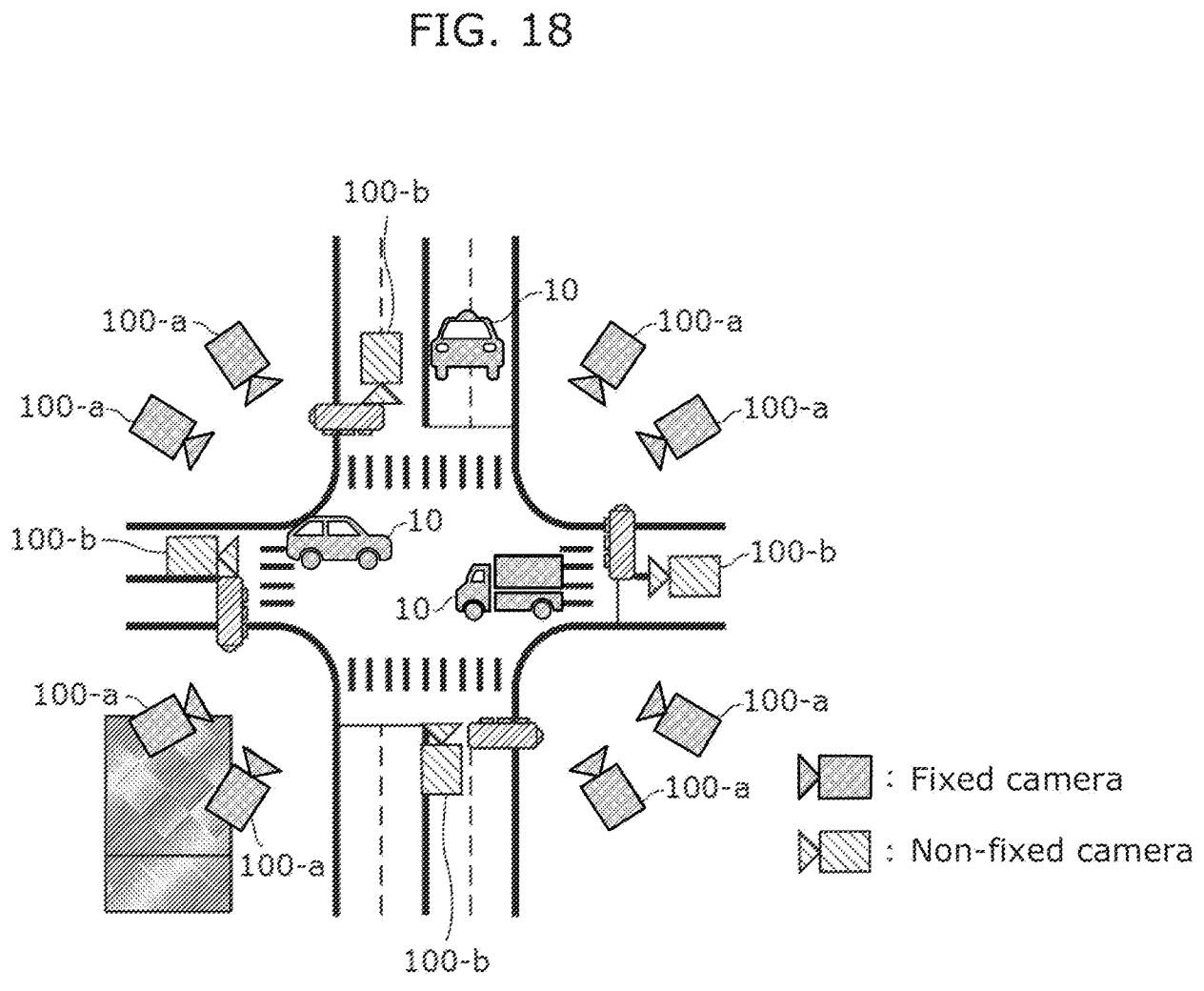

FIG. 18 is a diagram illustrating an outline of three-dimensional space recognition. As described above, a space to be shot can be three-dimensionally reconstructed (three-dimensional space reconstruction) by shooting the same space from multi-viewpoints by using a calibrated camera (for example, fixed camera). Using these three-dimensionally reconstructed data, three-dimensional displacement measurement etc. can be performed. This allows realization of a next-generation wide-area monitoring system, and a three-dimensional displacement measuring system. Specifically, at a crossing etc. on a roadway, traveling vehicles 10 etc. are shot using fixed cameras **100-*a* or non-fixed cameras 100-*b*, and three-dimensional displacements of vehicles 10** etc. can be measured.

The three-dimensional displacement measuring device described above may perform the three-dimensional displacement measurement of a subject and further perform the three-dimensional modeling of the subject but is not limited to this. The three-dimensional displacement measuring device may perform the three-dimensional modeling of a subject without performing the three-dimensional displacement measurement of the subject.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure can be applied to a three-dimensional displacement measuring method and a three-dimensional displacement measuring device, and can be applied to, for example, an infrastructure inspection system, an industrial machine monitoring system, a three-dimensional space recognition system, a next-generation monitoring system, etc.

The invention claimed is:

1. A three-dimensional displacement measuring method comprising:

calculating camera parameters of N cameras based on M correction images shot at M viewpoints by cameras including the N cameras, the M viewpoints being mutually different; and measuring a displacement over time of a subject caused by vibration of the subject in a three-dimensional space, based on (1) sets of N images shot at N viewpoints and (2) the camera parameters, wherein N is an integer greater than 1, and M is an integer greater than N, the N images in each of the sets are generated by the N cameras shooting the subject at a same time, and the sets are generated at different times, the different times are set according to a frequency of the vibration of the subject, and the M viewpoints used in the calculating of the camera parameters include all of the N viewpoints corresponding to arrangement positions of the N cameras used in the measuring of the displacement, and further include at least one additional viewpoint that is not used in the measuring of the displacement.

2. The three-dimensional displacement measuring method according to claim 1, wherein the frequency of the vibration is a resonance frequency of the subject.

3. The three-dimensional displacement measuring method according to claim 2, wherein the different times include at least three different times for each time period represented by a reciprocal of the resonance frequency.

4. The three-dimensional displacement measuring method according to claim 1, wherein the measuring of the displacement includes:

calculating three-dimensional points each of which is a three-dimensional point corresponding to a different one of the different times, by performing, on each of the sets of N images:

(i) calculating a first corresponding point of the subject and a second corresponding point which corresponds to the first corresponding point, the first corresponding point being included in a first image included in the N images, the second corresponding point being included in a second image included in the N images; and (ii) calculating a three-dimensional point of the subject in the three-dimensional space, based on the camera parameters, the first corresponding point, and the second corresponding point; and calculating a displacement over time of the three-dimensional point, from the three-dimensional points.

5. The three-dimensional displacement measuring method according to claim 1, wherein N is determined based on the camera parameters and an accuracy of the measuring of the displacement.

6. The three-dimensional displacement measuring method according to claim 1, wherein the N cameras include a first camera and a second camera which are disposed next to each other, the M viewpoints include a first midpoint between a first position at which the first camera is disposed and a second position at which the second camera is disposed, and when a midpoint between the first position and the first midpoint is designated as a second midpoint, more viewpoints among the M viewpoints are provided between the second midpoint and the first position than between the first midpoint and the second midpoint.

7. The three-dimensional displacement measuring method according to claim 6, wherein in the calculating of the camera parameters, no viewpoint is provided between the first midpoint and the second midpoint.

8. The three-dimensional displacement measuring method according to claim 1, wherein the N cameras include a non-fixed camera.

9. A three-dimensional displacement measuring device comprising:

memory; and a processor coupled to the memory and configured to:

calculate camera parameters of N cameras based on M correction images shot at M viewpoints by cameras including the N cameras, the M viewpoints being mutually different; and measure a displacement over time of a subject caused by vibration of the subject in a three-dimensional space, based on (1) sets of N images shot at N viewpoints and (2) the camera parameters, wherein N is an integer greater than 1, and M is an integer greater than N, the N images in each of the sets are generated by the N cameras shooting the subject at a same time, and the sets are generated at different times, the different times are set according to a frequency of the vibration of the subject, and the M viewpoints used in the calculating of the camera parameters include all of the N viewpoints corresponding to arrangement positions of the N cameras used in the measuring of the displacement, and further include at least one additional viewpoint that is not used in the measuring of the displacement.

* * * * *